US010264811B2

(12) United States Patent
Shi et al.

(10) Patent No.: US 10,264,811 B2
(45) Date of Patent: Apr. 23, 2019

(54) STEVIA SWEETENER WITH IMPROVED SOLUBILITY

(71) Applicant: EPC NATURAL PRODUCTS CO., LTD., Beijing (CN)

(72) Inventors: Jingang Shi, Beijing (CN); Wang Hansheng, Beijing (CN)

(73) Assignee: EPC NATURAL PRODUCTS CO., LTD., Beijing (CN)

( * ) Notice: Subject to any disclaimer, the term of this patent is extended or adjusted under 35 U.S.C. 154(b) by 261 days.

(21) Appl. No.: 14/714,644

(22) Filed: May 18, 2015

(65) Prior Publication Data
US 2015/0327584 A1 Nov. 19, 2015

Related U.S. Application Data

(60) Provisional application No. 62/023,216, filed on Jul. 11, 2014, provisional application No. 62/000,210, filed on May 19, 2014.

(51) Int. Cl.
*A23L 27/30* (2016.01)
*A23L 33/10* (2016.01)

(52) U.S. Cl.
CPC .............. *A23L 27/36* (2016.08); *A23L 33/10* (2016.08); *A23V 2002/00* (2013.01); *A23V 2200/238* (2013.01); *A23V 2250/258* (2013.01); *A23V 2250/262* (2013.01)

(58) Field of Classification Search
CPC .............................. A23L 1/2366; A23L 27/36
USPC ........................................................ 426/548
See application file for complete search history.

(56) References Cited

U.S. PATENT DOCUMENTS

| | | | |
|---|---|---|---|
| 3,529,602 A | 9/1970 | Hind et al. | |
| 3,703,177 A | 11/1972 | Hind et al. | |
| 4,082,858 A | 4/1978 | Morita et al. | |
| 4,353,889 A | 10/1982 | DuBois | |
| 4,361,697 A | 11/1982 | Dobberstein et al. | |
| 4,612,942 A | 9/1986 | Dobberstein et al. | |
| 4,892,938 A | 1/1990 | Giovanetto | |
| 5,112,610 A | 5/1992 | Kienle | |
| 5,962,678 A | 10/1999 | Payzant et al. | |
| 5,972,120 A | 10/1999 | Kutowy et al. | |
| 6,096,870 A | 8/2000 | Mozaffar et al. | |
| 7,238,379 B2 | 7/2007 | Lang | |
| 7,923,552 B2 | 4/2011 | Jackson et al. | |
| PP22,593 P3 | 3/2012 | Garnighian | |
| 8,153,563 B2 | 4/2012 | Morgan et al. | |
| 8,257,948 B1 | 9/2012 | Markosyan | |
| PP23,164 P3 | 11/2012 | Alvarez Britos | |
| 8,318,459 B2 | 11/2012 | Markosyan | |
| 8,367,138 B2 | 2/2013 | Prakash et al. | |
| 2003/0138538 A1 | 7/2003 | Kitazume et al. | |
| 2003/0139610 A1 | 7/2003 | Khare et al. | |
| 2006/0083838 A1 | 4/2006 | Jackson et al. | |
| 2006/0134292 A1 | 6/2006 | Abelyan et al. | |
| 2006/0142555 A1 | 6/2006 | Jonnala et al. | |
| 2007/0003679 A1 | 1/2007 | Shimizu et al. | |
| 2007/0082103 A1 | 4/2007 | Magomet et al. | |
| 2007/0116823 A1 | 5/2007 | Prakash et al. | |
| 2007/0116830 A1* | 5/2007 | Prakash ............... | A23C 9/1307 426/548 |
| 2007/0116835 A1 | 5/2007 | Prakash et al. | |
| 2007/0128311 A1 | 6/2007 | Prakash et al. | |
| 2007/0292582 A1* | 12/2007 | Prakash .................. | C07H 1/08 426/548 |
| 2008/0026111 A1 | 1/2008 | Bellody et al. | |
| 2008/0300402 A1 | 12/2008 | Yang et al. | |
| 2010/0099857 A1 | 4/2010 | Evans | |
| 2010/0112156 A1 | 5/2010 | Abelyan et al. | |
| 2010/0137569 A1 | 6/2010 | Prakash et al. | |
| 2010/0316782 A1 | 12/2010 | Shi et al. | |
| 2011/0183056 A1* | 7/2011 | Morita ................. | C07H 15/256 426/442 |
| 2011/0195161 A1 | 8/2011 | Upreti et al. | |
| 2012/0058236 A1 | 3/2012 | Fosdick et al. | |
| 2012/0058247 A1 | 3/2012 | Shi | |
| 2012/0090062 P1 | 4/2012 | Alvarez Britos | |
| 2012/0090063 P1 | 4/2012 | Alvarez Britos | |
| 2012/0184500 A1 | 7/2012 | Goralczyk et al. | |
| 2012/0214751 A1 | 8/2012 | Markosyan | |
| 2012/0214752 A1 | 8/2012 | Markosyan | |
| 2012/0269954 A1 | 10/2012 | Bridges et al. | |
| 2012/0282389 A1 | 11/2012 | Purkayastha et al. | |
| 2012/0301589 A1 | 11/2012 | Markosyan | |
| 2013/0071537 A1 | 3/2013 | Shi et al. | |
| 2013/0274351 A1 | 10/2013 | Markosyan et al. | |
| 2013/0337138 A1 | 12/2013 | Purkayastha et al. | |

FOREIGN PATENT DOCUMENTS

| | | |
|---|---|---|
| AU | 2004/202670 | 1/2005 |
| CA | 2 185 496 | 3/1998 |
| CN | 1192447 | 9/1998 |

(Continued)

OTHER PUBLICATIONS

International Search Report and Written Opinion from PCT/IB2015/053685, dated Sep. 24, 2015, 14 pages.
Kasai, et al., "Synthesis of Sweet Diterpene-Glycoside of Leaves of Stevia: rebaudiosides-A, -D, -E and their relating glycosides as well as Relationship between their Sweetness and Chemical Structure", Journal of Chemical Society of Japan, No. 5, 1981, pp. 726-735.
Kinghorn, et al., "Studies to Identify, Isolate, Develop and test Naturally Occurring Noncariogenic Sweeteners that May be Used as Dietary Sucrose Substitutes", Government Reports and Announcements Index, United States, Chemical Abstracts, 1985, 35 pages.
Kolb, et al., "Analysis of Sweet Diterpene Glycosides from Stevia rebaudiana: Improved HPLC Method", Journal of Agricultural Food Chemistry, vol. 49, 2001, pp. 4538-4541.

(Continued)

*Primary Examiner* — Jeffrey P Mornhinweg
(74) *Attorney, Agent, or Firm* — Michael Ye; Morris, Manning & Martin, LLP

(57) ABSTRACT

The invention describes a *stevia* sweetener with improved solubility in an aqueous solution for convenience of use in the food and beverage industry.

12 Claims, 2 Drawing Sheets

(56) References Cited

FOREIGN PATENT DOCUMENTS

| | | |
|---|---|---|
| CN | 1238341 | 12/1999 |
| CN | 1243835 | 2/2000 |
| CN | 101220062 | 7/2001 |
| CN | 1078217 C | 1/2002 |
| CN | 1535607 | 10/2004 |
| CN | 101062078 | 10/2007 |
| CN | 101200480 | 6/2008 |
| CN | 101330833 | 12/2008 |
| CN | 101472487 | 7/2009 |
| CN | 101662955 | 3/2010 |
| CN | 101801177 | 8/2010 |
| CN | 101854814 | 10/2010 |
| EP | 2 215 914 | 8/2010 |
| EP | 2 415 358 | 2/2012 |
| EP | 2 428 123 | 3/2012 |
| EP | 2 456 450 | 5/2012 |
| EP | 2 457 450 | 5/2012 |
| EP | 2 460 419 | 6/2012 |
| EP | 2 486 806 | 8/2012 |
| FR | 2 968 170 | 6/2012 |
| JP | 52-023100 | 2/1977 |
| JP | 52-062300 | 5/1977 |
| JP | 54-041898 | 4/1979 |
| JP | 54-041899 | 4/1979 |
| JP | 54-041900 | 4/1979 |
| JP | 55-092400 | 7/1980 |
| JP | 56-121453 | 9/1981 |
| JP | 56-121454 | 9/1981 |
| JP | 56-121455 | 9/1981 |
| JP | 57-086264 | 5/1982 |
| JP | 58-101660 | 6/1983 |
| JP | 59120073 | 11/1984 |
| JP | 62-146599 | 6/1987 |
| JP | 63-173531 | 7/1988 |
| JP | 2-261359 | 10/1990 |
| JP | 6-192283 | 7/1994 |
| JP | 7-143860 | 6/1995 |
| JP | 7-177862 | 7/1995 |
| JP | 08-000214 | 1/1996 |
| JP | 08-325156 | 10/1996 |
| JP | 11-243906 | 9/1999 |
| JP | 2002-45145 | 2/2002 |
| JP | 2002-262822 | 9/2002 |
| JP | 2004-344071 | 12/2004 |
| JP | 2012-005483 | 1/2012 |
| JP | 2012-090629 | 5/2012 |
| KR | 1996-0016568 | 12/1996 |
| KR | 2004-0026747 | 4/2004 |
| WO | WO 00/49895 | 8/2000 |
| WO | WO 2003/003994 | 1/2003 |
| WO | WO 03-033097 | 4/2003 |
| WO | WO 06-038221 | 4/2006 |
| WO | WO 06-045023 | 4/2006 |
| WO | WO 06-072921 | 7/2006 |
| WO | WO 2006095366 | 9/2006 |
| WO | WO 2007/061810 | 5/2007 |
| WO | WO 2007/061898 A1 | 5/2007 |
| WO | WO 2008/057968 | 5/2008 |
| WO | WO 2008/091547 | 7/2008 |
| WO | WO 2008/147725 | 12/2008 |
| WO | WO 2009/086049 A2 | 7/2009 |
| WO | WO 2009/140394 A1 | 11/2009 |
| WO | WO 2010/150930 | 12/2010 |
| WO | WO 2011/059954 | 5/2011 |
| WO | WO 2011/094423 | 8/2011 |
| WO | WO 2011/161027 | 12/2011 |
| WO | WO 2012/031879 | 3/2012 |
| WO | WO 2012/006742 | 5/2012 |
| WO | WO 2012/057575 | 5/2012 |
| WO | WO 2012/068457 | 5/2012 |
| WO | WO 2012/073121 A2 | 6/2012 |
| WO | WO 2012/082677 | 6/2012 |
| WO | WO 2012/089861 | 7/2012 |
| WO | 2012/108894 | 8/2012 |
| WO | WO 2012/102769 | 8/2012 |
| WO | WO 2012/108894 | 8/2012 |
| WO | WO 2012/109506 | 8/2012 |
| WO | WO 2012/109585 | 8/2012 |
| WO | WO 2012/112177 | 8/2012 |
| WO | WO 2012/112180 | 8/2012 |
| WO | WO 2012/134502 | 10/2012 |
| WO | WO 2012/153339 | 11/2012 |
| WO | 2012/166163 | 12/2012 |
| WO | WO 2012/166163 | 12/2012 |
| WO | WO 2012/166164 | 12/2012 |
| WO | WO 2013/036366 | 3/2013 |
| WO | 2013/123281 | 8/2013 |
| WO | WO 2013/123281 | 8/2013 |

OTHER PUBLICATIONS

Ohtani, et al., "Methods to Improve the Taste of the Sweet Principles of Stevia Rebaudiana", Stevia, The Genus *Stevia*, Edited by A. Douglas Kinghorn, CRC Press, Print ISBN 978-0-41526830-1, 2001, pp. 138-159.

Prakash, et al., "Development of rebiana, a natural, non-caloric sweetener", Food and Chemical Toxicology, No. 46(7), 2008, pp. S75-S82.

Sharma, et al., "Chemistry and in vivo profile of ent-kaurene glycosides of Stevia rebaudianna Bertoni—An overview", Natural Product Radiance, vol. 8(2), 2009, pp. 181-189.

Tanaka, "Improvement of Taste of Natural Sweeteners", Pure & Appl. Chem., vol. 69, No. 4, 1997, pp. 675-683.

Abou-Arab, et al., "Physico-chemical assessment of natural sweeteners steviosides produced from *Stevia rebaudiana bertoni* plant", African J. Food Sci., May 2010, vol. 4, No. 5, pp. 269-281.

Brandle, et al., "Steviol glycoside biosynthesis", Phytochemistry. 2007, No. 68(14), pp. 1855-1863.

Crammer, B. and Ikan, R. "Progress in the chemistry and properties of rebaudiosides," In Developments in Sweeteners—3, T.H. Grenby (ed), Elsevier Applied Science, London, pp. 45-64 (1987).

Makapugay, et al., "Improved high-performance liquid chromatographic separation of the Stevia rebaudiana sweet diterpene glycosides using linear gradient elution", Journal of Chromatography, No. 283, 1984, pp. 390-395.

Serajuddin, "Salt Formation to Improve Drug Solubility", Advance Drug Delivery Reviews, No. 59, 2007, pp. 603-616.

Shibata, et al. Glucosylation of Steviol and Steviol-Glucosides in Extracts from Stevia rebaudiana Bertoni, Plant Physiol. 1991, vol. 95, pp. 152-156.

Upreti, et al. "Solubility Enhancement of Steviol Glycosides and Characterization of Their Inclusion Complex with Gamma-Cyclodextrin", Int. J. Mol. Sci. Nov. 2011, vol. 12, pp. 7259-7553.

International Search Report from related PCT Application PCT/IB2011/002636, dated Apr. 12, 2012, 3 pages.

International Search Report from PCT/US2012/029613, dated Feb 1, 2013, 3 pages.

International Preliminary Report on Patentability from related PCT Application PCT/IB2011/002636, dated Feb. 26, 2013, 5 pages.

International Search Report from PCT/US2008/000700, dated Jul. 31, 2008, 5 pages.

International Search Report from PCT/IB2010/003045, dated May 5, 2011, 4 pages.

International Search Report and Written Opinion from PCT/IB2011/003351, dated Jul. 26, 2012, 5 pages.

International Search Report and Written Opinion from PCT/IB2010/001636, dated Dec. 2, 2010, 4 pages.

Extended European Search Report from related European Application No. 12756924.2, dated Feb. 6, 2015, 6 pages.

Extended European Search Report from related European Application No. 11844323.3, dated Feb. 11, 2015, 8 pages.

Extended European Search Report from related PCT Application PCT/IB2010/003045, dated May 6, 2013, 5 pages.

Extended European Search Report from related European Application No. 10789086.5, dated Jun. 6, 2014, 12 pages.

\* cited by examiner

STEVIA SWEETENER WITH IMPROVED SOLUBILITY

CROSS REFERENCE TO RELATED APPLICATIONS

This application claims the priority dates of U.S. Provisional Patent Application No. 62/000,210, filed May 19, 2014, and U.S. Provisional Patent Application No. 62/023,216, filed Jul. 11, 2014 The disclosures of which are incorporated by reference herein in its their entirety.

FIELD OF THE INVENTION

The present invention generally relates to *stevia* sweetener with improved long term solubility.

BACKGROUND OF THE INVENTION

*Stevia* is a genus of about 240 species of herbs and shrubs in the sunflower family (Asteraceae), native to subtropical and tropical South America and Central America.

The species *Stevia rebaudiana* Bertoni, commonly known as sweet leaf, sugarleaf, or simply *stevia*, is widely grown for its sweet leaves. The leaves have traditionally been used as a sweetener. Steviosides and rebaudiosides are the major constituents of glycosides found in the leaves of the *stevia* plant.

Over 100 phytochemicals have been discovered in *stevia*. It is rich in terpenes and flavonoids. Of these eight glycosides, stevioside is considered the sweetest and has been tested to be approximately 300 times sweeter than sugar. Stevioside, comprising 6-18% of the *stevia* leaf, is also the most prevalent glycoside in the leaf. Other sweet constituents include steviolbioside, rebaudiosides A-E, and dulcoside A.

*Stevia* extracts generally contain a high percentage of the glycosides of the diterpene steviol. The leaves of *stevia rebaudiana* contain over 10 different steviol glycosides. Steviol glycosides are considered high intensity sweeteners (about 250-300 times that of sucrose) and have been used for several years in a number of countries as a sweetener for a range of food products. Stevioside and rebaudioside A are the principal sweetening compounds and generally accompanied by smaller amounts of other steviol glycosides. The taste quality of rebaudioside A is better than stevioside, because of increased sweetness and decreased bitterness (Phytochemistry 68, 2007, 1855-1863).

The structures and chemical abstract service registry numbers for steviol and its glycosides that are the main sweetening agents of the additive steviol glycosides are shown below:

| | Compound name | C.A.S. No. | $R_1$ | $R_2$ |
|---|---|---|---|---|
| 1 | Steviol | 471-80-7 | H | H |
| 2 | Steviolbioside | 41093-60-1 | H | β-Glc-β-Glc(2→1) |
| 3 | Stevioside | 57817-89-7 | β-Glc | β-Glc-β-Glc(2→1) |
| 4 | Rebaudioside A | 58543-16-1 | β-Glc | β-Glc-β-Glc(2→1) \| β-Glc(3→1) |
| 5 | Rebaudioside B | 58543-17-2 | H | β-Glc-β-Glc(2→1) \| β-Glc(3→1) |
| 6 | Rebaudioside C | 63550-99-2 | β-Glc | β-Glc-β-Rha(2→1) \| β-Glc(3→1) |
| 7 | Rebaudioside D | 63279-13-0 | β-Glc-β-Glc(2→1) | β-Glc-β-Glc(2→1) \| β-Glc(3→1) |
| 8 | Rebaudioside E | 63279-14-1 | β-Glc-β-Glc(2→1) | β-Glc-β-Glc(2→1) |
| 9 | Rebaudioside F | 438045-89-7 | β-Glc | β-Glc-β-Xyl(2→1) \| β-Glc(3→1) |
| 10 | Rubusoside | 63849-39-4 | β-Glc | β-Glc |
| 11 | Dulcoside A | 64432-06-0 | β-Glc | β-Glc-α-Rha(2→1) |
| 12 | Rebaudioside M (also known as Rebaudioside X) | 1220616-44-3 | (β-Glc)$_2$-β-glc- | ((β-Glc)$_2$-β-glc- |

As a sweetener and sugar substitute, rebaudioside A has a slower onset and longer duration than that of sugar, and be deemed very close to sucrose, although some of its extracts may have a bitter or licorice-like aftertaste at high concentrations. All steviol glycosides are bitter, some in less degree and some in greater degree.

The relationship between steviol glycoside mixtures, solubility, and how solubility of these mixtures affects the overall taste profile of *stevia* sweeteners has not been studied in detail.

Recrystallization of rebaudioside A may produce various polymorphs that can vary in of solubility. For example, U.S. Pat. No. 8,367,138 discloses rebaudioside A solubility for various forms. Form 1: a rebaudioside A hydrate; Form 2: an anhydrous rebaudioside A; and Form 3: a rebaudioside A solvate. In addition to the three polymorph forms of rebaudioside A, the purification of rebaudioside A may result in the formation of an amorphous form of rebaudioside A, Form 4.

|  | Form 1 | Form 2 | Form 3 | Form 4 |
|---|---|---|---|---|
| Rate of dissolution in water at 25° C. | Very low (<0.2%/60 min) | Intermediate (<30%/5 minutes) | High (>30%/5 minutes) | High (>35%/5 minutes) |
| Alcohol content | <0.5% | <1% | 1-3% | <0.05% |
| Moisture content | >5% | <1% | <3% | 6.74% |

Therefore, a need for steviol glycosides or a *stevia* glycoside composition with superior solubility exists in the food and beverage industry.

BRIEF SUMMARY OF THE INVENTION

An embodiment is presented that surprisingly provides a steviol glycoside or a steviol glycoside composition and/or a *stevia* sweetener with significantly improved long term solubility in water over previously reported *stevia* compositions.

Another embodiment of the present invention is directed to a process for preparing a steviol glycoside or a steviol glycoside composition and/or a *stevia* sweetener with significantly improved long term solubility in water over previously reported *stevia* compositions. The process provides a *stevia* extract, a *stevia* component, or mixtures of *stevia* components that are treated.

Yet another embodiment of the present invention is directed to a concentrated aqueous *stevia* sweetener solution with high concentration of steviol glycoside or steviol glycoside compositions.

DETAILED DESCRIPTION

Figure 1:
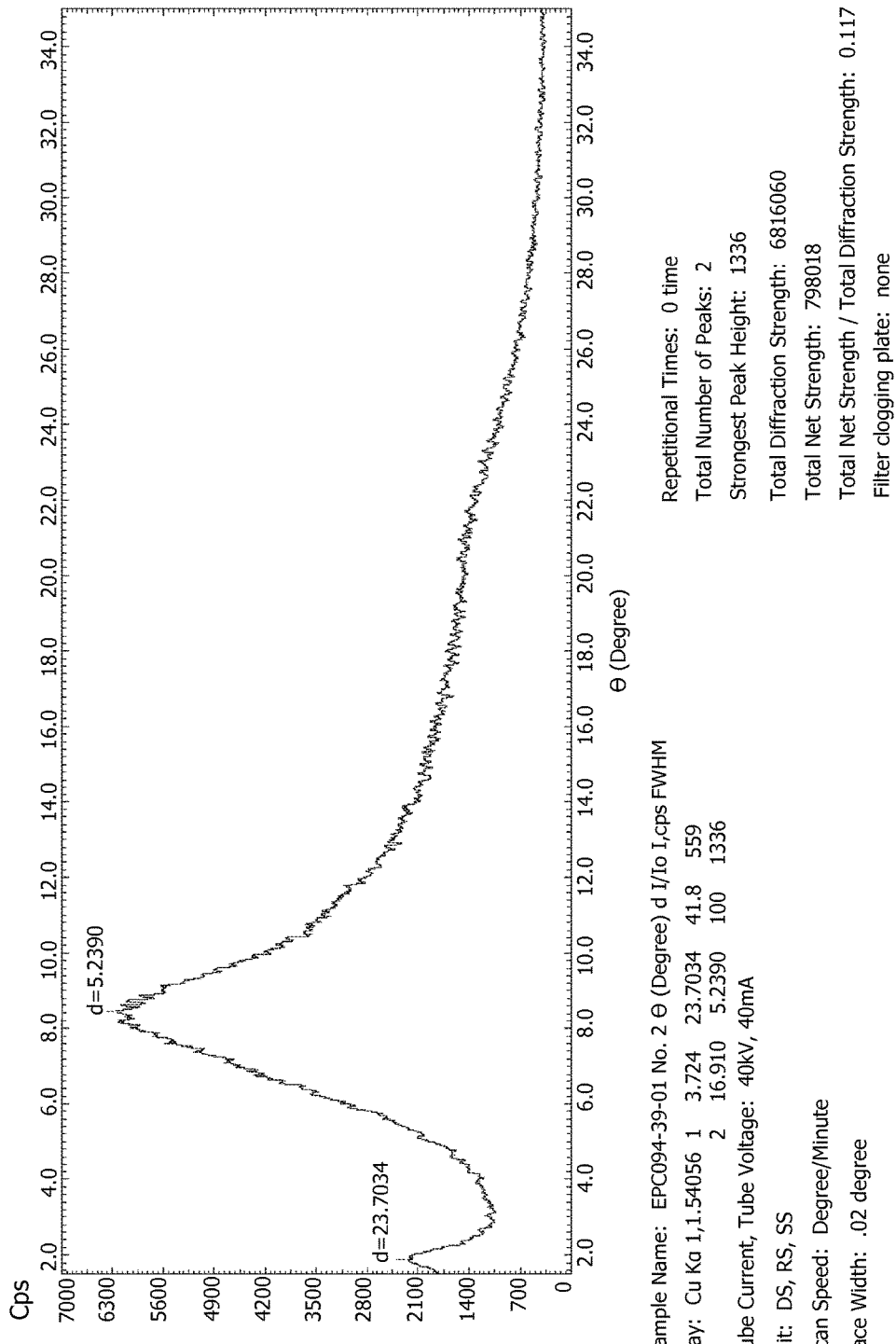
FIG. 1 shows a Power XRD spectrum of sample 094-39-01.

In order to improve the taste of steviol glycosides, researchers have attempted to develop various compositions of steviol glycosides.

For example, U.S. Patent Application Publication No. 2010-0316782 discloses a *stevia* composition comprising rebaudioside A and rebaudioside D. It is believed that rebaudioside D overcomes, decreases, eliminates or masks the aftertaste of rebaudioside A.

Another example provided in U.S. Patent Application Publication No. 2013-0071537 discloses a *stevia* composition comprising rebaudioside B and/or its derivatives. It is believed that rebaudioside B provides the ability to mask, decrease or eliminate bitterness in *stevia* extract compositions.

In still another example, U.S. Patent Application Publication No. 2012-0058247 discloses various *stevia* compositions that do not have the bitterness or aftertaste associated with purified RA or typical *stevia* extracts that are used as sweeteners.

However, the application of the *stevia* compositions described above are limited by the physical properties, especially solubility, of one or more of the components. For example, at room temperature, rebaudioside D will only dissolve in water up to 0.05% wt/wt. The solubility of rebaudioside D can reach 0.5% wt/wt in aqueous solution with heating, but upon cooling to room temperature, rebaudioside D will quickly crystallize from solution (U.S. Ser. No. 13/993,415).

In order to extend the use of *stevia* glycosides, many efforts have been devoted to improve the solubility of *stevia* glycosides in water.

U.S. Patent Application Publication No. 2012-0058236 discloses a highly soluble crystal form of rebaudioside A, with a room temperature solubility ranging from about 30% wt/wt rebaudioside A in water or greater. This highly soluble crystal form can be prepared by ripening (heating) a slurry of either the hydrate, anhydrous, or amorphous form of rebaudioside A at high temperature.

U.S. Patent Application Publication No. 2013-0274351 discloses a process to obtain highly soluble rebaudioside D. Rebaudioside D is dissolved in water or aqueous alcohol to make a solution. The solution is then dried to produce a highly soluble Rebaudioside D. The method may additionally comprise the step of blending rebaudioside D with a polyol to form a blend, in order to further improve the solubility.

WO2012/109506 discloses a process to obtain highly soluble *stevia* sweetener. This soluble *stevia* sweetener is prepared by mixing water and a *stevia* sweetener powder consisting of stevioside 0.2%, rebaudioside C 0.3%, rebaudioside F 0.3%, rebaudioside A 97.7%, rebaudioside D 1.0%, rebaudioside B 0.3% to make a mixture, increasing the temperature of the mixture gradually to 118-125° C. make a solution, holding the solution at an elevated temperature, and decreasing the temperature of the solution gradually to ambient temperature to obtain a stable and concentrated *stevia* sweetener solution that can be spray dried to provide a soluble *stevia* sweetener.

WO2013/036366 discloses a soluble *stevia* mixtures comprising rebaudioside D. The soluble *stevia* sweetener is prepared by mixing 25% wt/wt rebaudioside D, rebaudioside D and A, and rebaudioside D and B with water to make a mixture, increasing the temperature of the mixture gradually to 118-125° C. and holding the solution at that elevated temperature to make a solution. The temperature was then decreased gradually to 80° C. to obtain concentrated solutions of rebaudioside D, rebaudioside D and A, or rebaudioside D and B where precipitation is observed. The solution then can be spray dried to provide a soluble *stevia* sweetener.

An embodiment of the present disclosure surprisingly finds that the long term solubility of a steviol glycoside or a steviol glycoside composition can be significantly improved by solubilizing the steviol glycoside or steviol glycoside composition at elevated temperature in water and then lowing to ambient temperature. The resultant solution can be spray dried wherein the steviol glycoside or a steviol glycoside composition are stable in water or water/alcohol for greater than 1 day at ambient temperature. The terms "stable" or "stability" throughout the specification refers to without limitation, the duration of solubility of the steviol glycoside or a steviol glycoside composition when dissolved in a solvent. The process provides a *stevia* extract, a *stevia* component, or mixtures of *stevia* components that are treated.

The long term solubility of the current embodiments differentiate over initial or short term solubility. The solubility disclosed throughout the present disclosure is "long term solubility", not "initial solubility" as described in the field. In other words, the solutions of the present invention remain homogenous for a long period of time, without crystallization, precipitation, or solution heterogeneity. Generally long term solubility described herein is from at least 1 day to greater than 5 years, from about 5 days to about 2 years, and more particularly from about 30 days to about 1 year. The technology may also be applied to for improving the initial solubility of single steviol glycoside.

Even though the steviol glycosides or steviol glycoside compositions are directed to having long term solubility at ambient temperature, the current embodiments can cover temperatures that range from 0° C. to 25° C. Even though the range of stability of the current embodiments is directed to stability between 0° C. to 25° C., good stability outside this range can also be expected especially at temperatures above this range.

Another embodiment further discloses that the solubility of a first steviol glycoside can be further improved by adding a second steviol glycoside, solubilizing the steviol glycosides as a composition at elevated temperature, and then lowing to ambient temperature in an aqueous solution.

Another embodiment further discloses that the solubility of a first and a second steviol glycoside can be further improved, by adding a third steviol glycoside, solubilizing the resulting steviol glycoside composition at elevated temperature and then lowing to ambient temperature in an aqueous solution.

In yet another embodiment further discloses that the solubility of a first and a second steviol glycoside (a steviol glycoside composition) can be further improved, by adding at least a third steviol glycoside, by solubilizing the steviol glycosides at elevated temperature and then lowing to ambient temperature in an aqueous solution.

A preferred embodiment discloses the mixture of rebaudiosides A and B, solubilizing the steviol glycosides at elevated temperature, and then lowering to ambient temperature in an aqueous solution.

Another preferred embodiment discloses the mixture of rebaudiosides A and D, solubilizing the steviol glycosides at elevated temperature, and then lowing to ambient temperature in an aqueous solution.

Another preferred embodiment discloses the mixture of rebaudiosides A, B, and D, solubilizing the steviol glycosides at elevated temperature, and then lowing to ambient temperature in an aqueous solution.

Another preferred embodiment further discloses the mixture of rebaudiosides A, B, and D, solubilizing the steviol glycosides at elevated temperature, lowing to ambient temperature in an aqueous solution, and then spray drying the solution to provide a highly soluble *stevia* based sweetener, e.g., a spray dried steviol glycoside composition.

One aspect of the present embodiments provide a treated steviol glycoside or a steviol glycoside composition, with improved solubility in an aqueous solution, in comparison with untreated steviol glycoside comprising rebaudioside A, B, and D individually, and mixtures thereof. For example, the solubility of the treated steviol glycoside or steviol glycoside composition in an aqueous solution is about ≥1 g/100 g water, preferably about ≥3 g/100 g water, more preferably about ≥5 g/100 g water, more preferably about ≥10 g/100 g water, more preferably about ≥15 g/100 g water, more preferably about ≥20 g/100 g water, more preferably about ≥25 g/100 g water, more preferably about ≥30 g/100 g water, more preferably about ≥35 g/100 g water, more preferably about ≥40 g/100 g water 1, more preferably about ≥45 g/100 g water, more preferably about ≥50 g/100 g water, more preferably about ≥55 g/100 g water, and most preferably ≥60 g/100 g water, and all ranges between 1 g/100 g water and 60 g/100 g water, for example, from about 1 g/100 g water to about 5 g/100 g water, from about 1 g/100 g water to about 10 g/100 g water, from about 2 g/100 g water to about 5 g/100 g water, from about 2 g/100 g water to about 10 g/100 g water, from about 3 g/100 g water to about 10 g/100 g water, from about 3 g/100 g water to about 15 g/100 g water, from about 5 g/100 g water to about 10 g/100 g water, from about 5 g/100 g water to about 15 g/100 g water, from about 5 g/100 g water to about 20 g/100 g water, from about 7 g/100 g water to about 10 g/100 g water, from about 7 g/100 g water to about 15 g/100 g water, from about 7 g/100 g water to about 20 g/100 g water, from about 10 g/100 g water to about 15 g/100 g water, from about 10 g/100 g water to about 20 g/100 g from about 10 g/100 g water to about 25 g/100 g water, from about 10 g/100 g water to about 30 g/100 g from about 12 g/100 g water to about 20 g/100 g from about 12 g/100 g water to about 25 g/100 g water, from about 12 g/100 g water to about 30 g/100 g water, from about 15 g/100 g water to about 20 g/100 g water, from about 15 g/100 g water to about 25 g/100 g water, from about 17 g/100 g water to about 20 g/100 g water, from about 17 g/100 g water to about 25 g/100 g, from about 17 g/100 g water to about 30 g/100 g water, from about 20 g/100 g water to about 25 g/100 g water, from about 20 g/100 g water to about 30 g/100 g water, from about 20 g/100 g water to about 40 g/100 g water, from about 20 g/100 g water to about 50 g/100 g water, from about 25 g/100 g water to about 30 g/100 g water, from about 25 g/100 g water to about 40 g/100 g water, from about 25 g/100 g water to about 50 g/100 g water at ambient temperature.

The steviol glycoside or the steviol glycoside compositions of the present embodiments may refer to their stability in a water or water/alcohol solutions. Stability of the steviol glycoside or the steviol glycoside compositions of the present embodiments refers to the solubility of the material without precipitation or crystallization or very minimal precipitation or crystallization measured in the range of between 0° C. and 25° C. This lower limit of the temperature range is not to be limiting and should be understood that the steviol glycoside or the steviol glycoside composition, once dissolved, can remain solubilized above 25° C.

The steviol glycoside or the steviol glycosides in the steviol glycoside composition can each individually be in an amorphous form, each individually in a polymorphic from, or mixtures thereof.

Preferably, the steviol glycoside or the steviol glycosides in the steviol glycoside composition according to one embodiment is in an amorphous form, but it may also be in a polymorph form.

In another aspect, an embodiment provides a sweetener composition, comprising one or more treated steviol glycosides, with improved solubility in an aqueous solution in comparison to untreated steviol glycosides comprising rebaudioside A, B, and D individually, and mixtures thereof, under identical conditions, and optionally, containing other sweeteners.

In another aspect the other sweetener can be stevioside.

In a further aspect, one embodiment provides a concentrated aqueous sweetener solution comprising treated steviol glycoside or a steviol glycoside composition, wherein the total content of the steviol glycosides is improved in comparison with the maximum total content of untreated steviol glycosides wt/wt in water or water/alcohol under identical conditions. For example, the total content of the steviol glycosides in a concentrated aqueous sweetener solution comprising a steviol glycoside or a steviol glycoside composition according to the present invention is ≥1% wt/wt in water, preferably ≥5% wt/wt in water, more preferably ≥10% wt/wt in water, more preferably ≥15% wt/wt in water, more preferably ≥20% wt/wt in water, more preferably ≥25% wt/wt in water, more preferably ≥30% wt/wt in water, more preferably ≥35% wt/wt in water, more preferably ≥40% wt/wt in water, more preferably ≥45% wt/wt in water, and preferably ≥50% wt/wt in water, and most preferably about 60% wt/wt in water, and all ranges between 1% wt/wt in water and 100% wt/wt in water, for example from about 1% wt/wt in water to about 99% wt/wt in water, from about 5% wt/wt in water to about 95% wt/wt in water, from about 10% wt/wt in water to about 90% wt/wt in water, from about 15% wt/wt in water to about 85% wt/wt in water, from about 20% wt/wt in water to about 80% wt/wt in water, from about 25% wt/wt in water to about 80% wt/wt in water, from about 30% wt/wt in water to about 80% wt/wt in water, from about 35% wt/wt in water to about 80% wt/wt in water, from about 40% wt/wt in water to about 80% wt/wt in water, from about 45% wt/wt in water to about 75% wt/wt in water, from about 50% wt/wt in water to about 75% wt/wt in water, from about 55% wt/wt in water to about 75% wt/wt in water, from about 55% wt/wt in water to about 70% wt/wt in water, and from about 55% wt/wt in water to about 65% wt/wt in water.

In one aspect the components can have ratios of from 1:99, 2:98, 3:97, 4:96, 5:95, 6:94, 7:93, 8:92, 9:91, 10:90, 11:89, 12:88, 13:87, 14:86, 15:85, 16:84, 17:83, 18:82, 19:81, 20:80, 21:79, 22:78, 23:77, 24:76, 25:75, 26:74, 27:73, 28:72, 29:71, 30:70, 31:69, 32:68, 33:67, 34:66, 35:65, 36:64, 37:63, 38:62, 39:61, 40:60, 41:59, 42:58, 43:57, 44:56, 45:55, 46:54, 47:53, 48:52, 49:51 and 50:50, and all ranges therebetween wherein the ratios are from 1:99 and vice versa, e.g., a ratio of from 1:99 to 50:50, from 30:70 to 42:58, etc.

In another aspect, the components can have ratios of from 1:1:98, 1:2:97, 1:3:96, 1:4:95, 1:5:94, 1:6:93, 1:7:92, 1:8:91, 1:9:90, 1:10:89, 1:11:88, 1:12:87, 1:13:86, 1:14:85, 1:15:84, 1:16:83, 1:17:82, 1:18:81, 1:19:80, 1:20:79, 1:21:78, 1:22:77, 1:23:76, 1:24:75, 1:25:74, 1:26:73, 1:27:72, 1:28:71, 1:29:70, 1:30:69, 1:31:68, 1:32:67, 2:3:95, 2:4:94, 2:5:93, 2:6:92, 2:7:91, 2:8:90, 2:9:89, 2:10:88, 2:11:87, 2:12:86, 2:13:85, 2:14:84, 2:15:83, 2:16:82, 2:17:81, 2:18:80, 2:19:79, 2:20:78, 2:21:77, 2:22:76, 2:23:75, 2:24:74, 2:25:73, 2:26:72, 2:27:71, 2:28:70, 2:29:69, 2:30:68, 2:31:67, 2:32:66, 2:3:95, 3:3:94, 3:4:93, 3:5:92, 3:6:91, 3:7:90, 3:8:89, 3:9:88, 3:10:87, 3:11:86, 3:12:85, 3:13:84, 3:14:83, 3:15:82, 3:16:81, 2:17:80, 3:18:79, 3:19:78, 3:20:77, 3:21:76, 3:22:75, 3:23:74, 3:24:73, 3:25:72, 3:26:71, 3:27:70, 3:28:69, 3:29:68, 3:30:67, 3:31:66, 3:32:65, 4:4:92, 4:5:91, 4:6:90, 4:7:89, 4:8:88, 4:9:87, 4:10:86, 4:11:85, 4:12:84, 4:13:83, 4:14:82, 4:15:81, 4:16:80, 4:17:79, 4:18:78, 4:19:77, 4:20:76, 4:21:75, 4:22:74, 4:23:73, 4:24:72, 4:25:71, 4:26:70, 4:27:69, 4:28:68, 4:29:67, 4:30:66, 4:31:65, 4:32:64, 5:5:90, 5:6:89, 5:7:88, 5:8:87, 5:9:86, 5:10:85, 5:11:84, 5:12:83, 5:13:82, 5:14:81, 5:15:80, 5:16:79, 5:17:78, 5:18:77, 5:19:76, 5:20:75, 5:21:74, 5:22:73, 5:23:72, 5:24:71, 5:25:70, 5:26:69, 5:27:68, 5:28:67, 5:29:66, 5:30:65, 5:31:64, 5:32:63, 6:6:88, 6:7:87, 6:8:86, 6:9:85, 6:10:84, 6:11:83, 6:12:82, 6:13:81, 6:14:80, 6:15:79, 6:16:78, 6:17:77, 6:18:76, 6:19:75, 6:20:74, 6:21:73, 6:22:72, 6:23:71, 6:24:70, 6:25:69, 6:26:68, 6:27:67, 6:28:66, 6:29:65, 6:30:64, 6:31:63, 6:32:62, 7:7:86, 7:8:85, 7:9:84, 7:10:83, 7:11:82, 7:12:81, 7:13:80, 7:14:79, 7:15:78, 7:16:77, 7:17:76, 7:18:75, 7:19:74, 7:20:73, 7:21:72, 7:22:71, 7:23:70, 7:24:69, 7:25:68, 7:26:67, 7:27:66, 7:28:65, 7:29:64, 7:30:63, 7:31:62, 7:32:61, 8:8:84, 8:9:83, 8:10:82, 8:11:81, 8:12:80, 8:13:79, 8:14:78, 8:15:77, 8:16:76, 8:17:75, 8:18:74, 8:19:73, 8:20:72, 8:21:71, 8:22:70, 8:23:69, 8:24:68, 8:25:67, 8:26:66, 8:27:65, 8:28:64, 8:29:63, 8:30:62, 8:31:61, 8:32:60, 9:9:82, 9:10:81, 9:11:80, 9:12:79, 9:13:78, 9:14:77, 9:15:76, 9:16:75, 9:17:74, 9:18:73, 9:19:72, 9:20:71, 9:21:70, 9:22:69, 9:23:68, 9:24:67, 9:25:66, 9:26:65, 9:27:64, 9:28:63, 9:29:62, 9:30:61, 9:31:60, 9:32:59, 10:10:80, 10:11:79, 10:12:78, 10:13:77, 10:14:76, 10:15:75, 10:16:74, 10:17:73, 10:18:72, 10:19:71, 10:20:70, 10:21:69, 10:22:68, 10:23:67, 10:24:66, 10:25:65, 10:26:64, 10:27:63, 10:28:62, 10:29:61, 10:30:60, 10:31:59, 10:32:58, 11:11:78, 11:12:77, 11:13:76, 11:14:75, 11:15:74, 11:16:73, 11:17:72, 11:18:71, 11:19:70, 11:20:69, 11:21:68, 11:22:67, 11:23:66, 11:24:65, 11:25:64, 11:26:63, 11:27:62, 11:28:61, 11:29:60, 11:30:59, 11:31:58, 11:32:57, 12:12:76, 12:13:75, 12:14:74, 12:15:73, 12:16:72, 12:17:71, 12:18:70, 12:19:69, 12:20:68, 12:21:67, 12:22:66, 12:23:65, 12:24:64, 12:25:63, 12:26:62, 12:27:61, 12:28:60, 12:29:59, 12:30:58, 12:31:57, 12:32:56, 13:13:74, 13:14:73, 13:15:72, 13:16:71, 13:17:70, 13:18:69, 13:19:68, 13:20:67, 13:21:66, 13:22:65, 13:23:64, 13:24:63, 13:25:62, 13:26:61, 13:27:60, 13:28:59, 13:29:58, 13:30:57, 13:31:56, 13:32:55, 14:14:72, 14:15:71, 14:16:70, 14:17:69, 14:18:68, 14:19:67, 14:20:66, 14:21:65, 14:22:64, 14:23:63, 14:24:62, 14:25:61, 14:26:60, 14:27:59, 14:28:58, 14:29:57, 14:30:56, 14:31:55, 14:32:54, 15:15:70, 15:16:69, 15:17:68, 15:18:67, 15:19:66, 15:20:65, 15:21:64, 15:22:63, 15:23:62, 15:24:61, 15:25:60, 15:26:59, 15:27:58, 17:28:57, 15:29:56, 15:30:55, 15:31:54, 15:32:53, 16:16:68, 16:17:67, 16:18:66, 16:19:65, 16:20:64, 16:21:63, 16:22:62, 16:23:61, 16:24:60, 16:25:59, 16:26:58, 16:27:57, 16:28:56, 16:29:55, 16:30:54, 16:31:53, 16:32:52, 17:17:66, 17:18:65, 17:19:64, 17:20:63, 17:21:62, 17:22:61, 17:23:60, 17:24:59, 17:25:58, 17:26:57, 17:27:56, 17:28:55, 17:29:54, 17:30:53, 17:31:52, 17:32:51, 18:18:64, 18:19:63, 18:20:62, 18:21:61, 18:22:60, 18:23:59, 18:24:58, 18:25:57, 18:26:56, 18:27:55, 18:28:54, 18:29:53, 18:30:52, 18:31:51, 18:32:50, 19:19:62, 19:20:61, 19:21:60, 19:22:59, 19:23:58, 19:24:57, 19:25:56, 19:26:55, 19:27:54, 19:28:53, 19:29:52, 19:30:51, 19:31:50, 19:32:49, 20:20:60, 20:21:59, 20:22:58, 20:23:57, 20:24:56, 20:25:55, 20:26:54, 20:27:53, 20:28:52, 20:29:51, 20:30:50, 20:31:49, 20:32:48, 21:21:58, 21:22:57, 21:23:56, 21:24:55, 21:25:54, 21:26:53, 21:27:52, 21:28:51, 21:29:50, 21:30:49, 21:31:48, 21:32:47, 22:22:56, 22:23:55, 22:24:54, 22:25:53, 22:26:52, 22:27:51, 22:28:50, 22:29:49, 22:30:48, 22:31:47, 22:32:46, 23:23:54, 23:24:53, 23:25:52, 23:26:51, 23:27:50, 23:28:49, 23:29:48, 23:30:47, 23:31:46, 23:32:45, 24:24:52, 24:25:51, 24:26:50, 24:27:49, 24:28:48, 24:29:47, 24:30:46, 24:31:45, 24:32:44, 25:25:50, 25:26:49, 25:27:48, 25:28:47, 25:29:46, 25:30:45, 25:31:44, 25:32:43, 26:26:48, 26:27:47, 26:28:46, 26:29:45, 26:30:44, 26:31:43, 26:32:42, 27:27:46, 27:28:45, 27:29:44, 27:30:43, 27:31:42, 27:32:41, 28:28:44, 28:29:43, 28:30:42, 28:31:41, 28:32:40, 29:29:42, 29:30:41, 29:31:40, 29:32:39, 30:30:40, 30:31:39, 30:32:38, 31:31:38, 31:32:37, 32:32:36, 32:33:35, and 33.3:33.3:33.3, and all ranges therebetween wherein the ratios are from 1:1:98 and vice versa, e.g., a ratio of from 1:1:99 to 33.3:33.3:33.3, from 10:30:70 to 15:40:45, etc.

In another aspect, a process for the preparation of a treated steviol glycoside or a steviol glycoside composition with improved solubility in an aqueous solution, in comparison with untreated steviol glycosides comprising rebaudioside A, B, and D individually, and mixtures thereof, comprising the following steps: (1) mixing a steviol glycoside or a steviol glycoside composition with water, (2) heating the mixture while stirring, until the mixture was completely dissolved to obtain a clear solution, (3) further stirring the solution at the elevated temperature, (4) cooling to ambient temperature, and (5) subjecting the solution to spray drying. In step (2), the mixture can be heated to 30-200° C., preferably 40-120° C., more preferably 50-90° C., most preferably 60-70° C. In an alternative process of the present invention, the step (5) can be replaced by crystallization of the steviol glycoside or the steviol glycoside composition.

In another embodiment the treated steviol glycoside(s) or steviol glycoside composition may be solubilized in a water/alcohol solution. The alcohol can be methanol, ethanol, propanol, isopropanol, n-butanol, isobutanol, sec-butanol, tert-butanol, n-pentanol, isopentanol, neopentanol, or combinations thereof.

The water alcohol solution can be less than 60% alcohol, less than 50% alcohol, less than 40% alcohol, less than 30% alcohol, less than 20% alcohol, less than 10% alcohol, less than 5% alcohol, less than 2% alcohol, or less than 1% alcohol by volume.

In the specification and in the claims, the terms "including" and "comprising" are open-ended terms and should be interpreted to mean "including, but not limited to . . . .". These terms encompass the more restrictive terms "consisting essentially of" and "consisting of."

It must be noted that as used herein and in the appended claims, the singular forms "a", "an", and "the" include plural reference unless the context clearly dictates otherwise. As well, the terms "a" (or "an"), "one or more" and "at least one" can be used interchangeably herein. It is also to be noted that the terms "comprising", "including", "characterized by" and "having" can be used interchangeably.

Unless defined otherwise, all technical and scientific terms used herein have the same meanings as commonly understood by one of ordinary skill in the art to which this invention belongs. All publications and patents specifically mentioned herein are incorporated by reference in their entirety for all purposes including describing and disclosing the chemicals, instruments, statistical analyses and methodologies which are reported in the publications which might be used in connection with the invention. All references cited in this specification are to be taken as indicative of the level of skill in the art. Nothing herein is to be construed as an admission that the invention is not entitled to antedate such disclosure by virtue of prior invention.

The phrase "steviol glycoside" is recognized in the art and is intended to include the major and minor constituents of *stevia*. These include, but are not limited to components of *stevia* such as Steviol, Steviolbioside, Stevioside, Rebaudioside A (RA), Rebaudioside B (RB), Rebaudioside C (RC), Rebaudioside D (RD), Rebaudioside E (RE), Rebaudioside F (RF), Rebaudioside M (RM, also referred to as Rebaudioside X, RX), Rubusoside and Ducoside A (DA).

The phrase "*stevia* containing sweetener" is intended to include any composition that is prepared from a *stevia* plant, such as a *stevia* extract, or the individual components found in *stevia*. The sweetener can include one or more of the components associated with the *stevia* plant, such as those noted above. The sweetener can also include conventional artificial or natural sweeteners, such as sucrose, glucose, maltose, fructose, mannitol, sorbitol, aspartame, inulin, sucralose, acesulfame-K, sodium cyclamate, mogroside and its derivatives, etc.

In one embodiment, rubusoside is also found in sweet tea, also known as *Rubus Suavissimus*. Although *stevia* contains a small amount of rubusoside, it can also be obtained from sweet tea containing rubusoside. The sweet tea extract can be extracted from sweet tea, for example, by a solvent extraction processes. The content of rubusoside in sweet tea extract can be from 5% wt/wt to 100% wt/wt, and the content of rubusoside containing sweet tea extract in the sweetener can be from 0% wt/wt to 100% wt/wt. Rubusoside can be 1% wt/wt, 2% wt/wt, 3% wt/wt, 4% wt/wt, 5% wt/wt, 6% wt/wt, 7% wt/wt, 8% wt/wt. 9% wt/wt, 10% wt/wt, 11% wt/wt, 12% wt/wt, 13% wt/wt, 14% wt/wt, 15% wt/wt, 16% wt/wt, 17% wt/wt, 18% wt/wt. 19% wt/wt, 20% wt/wt, 25% wt/wt, 30% wt/wt, 35% wt/wt, 40% wt/wt, 45% wt/wt, 50% wt/wt, 60% wt/wt, 70% wt/wt. 80% wt/wt, 90% wt/wt, or 100% wt/wt and all ranges between 1 and 100% wt/wt, for example from about 1% wt/wt to about 99% wt/wt, from about 1% wt/wt to about 98% wt/wt, from about 1% wt/wt to about 97% wt/wt, from about 1% wt/wt to about 95% wt/wt, from about 1% wt/wt to about 90% wt/wt, from about 1% wt/wt to about 80% wt/wt, from about 1% wt/wt to about 70% wt/wt, from about 1% wt/wt to about 60% wt/wt, from about 1% wt/wt to about 50% wt/wt, from about 1% wt/wt to about 40% wt/wt, from about 1% wt/wt to about 30% wt/wt, from about 1% wt/wt to about 20% wt/wt, from about 1% wt/wt to about 10% wt/wt, from about 1% wt/wt to about 5% wt/wt, from about 2% wt/wt to about 99% wt/wt, from about 2% wt/wt to about 98% wt/wt, from about 2% wt/wt to about 97% wt/wt, from about 2% wt/wt to about 95% wt/wt, from about 2% wt/wt to about 90% wt/wt, from about 2% wt/wt to about 80% wt/wt, from about 2% wt/wt to about 70% wt/wt, from about 2% wt/wt to about 60% wt/wt, from about 2% wt/wt to about 50% wt/wt, from about 2% wt/wt to about 40% wt/wt, from about 2% wt/wt to about 30% wt/wt, from about 2% wt/wt to about 20% wt/wt, from about 2% wt/wt to about 10% wt/wt, from about 2% wt/wt to about 5% wt/wt, from about 3% wt/wt to about 99% wt/wt, from about 3% wt/wt to about 98% wt/wt, from about 3% wt/wt to about 97% wt/wt, from about 3% wt/wt to about 95% wt/wt, from about 3% wt/wt to about 90% wt/wt, from about 3% wt/wt to about 80% wt/wt, from about 3% wt/wt to about 70% wt/wt, from about 3% wt/wt to about 60% wt/wt, from about 3% wt/wt to about 50% wt/wt, from about 3% wt/wt to about 40% wt/wt, from about 3% wt/wt to about 30% wt/wt, from about 3% wt/wt to about 20% wt/wt, from about 3% wt/wt to about 10% wt/wt, from about 3% wt/wt to about 5% wt/wt, from about 5% wt/wt to about 99% wt/wt, from about 5% wt/wt to about 98% wt/wt, from about 5% wt/wt to about 97% wt/wt, from about 5% wt/wt to about 95% wt/wt, from about 5% wt/wt to about 90% wt/wt, from about 5% wt/wt to about 80% wt/wt, from about 5% wt/wt to about 70% wt/wt, from about 5% wt/wt to about 60% wt/wt, from about 5% wt/wt to about 50% wt/wt, from about 5% wt/wt to about 40% wt/wt, from about 5% wt/wt to about 30% wt/wt, from about 5% wt/wt to about 20% wt/wt, from about 5% wt/wt to about 10% wt/wt, from about 10% wt/wt to about 99% wt/wt, from about 10% wt/wt to about 98% wt/wt, from about 10% wt/wt to about 97% wt/wt, from about 10% wt/wt to about 95% wt/wt, from about 10% wt/wt to about 90% wt/wt, from about 10% wt/wt to about 80% wt/wt, from about 10% wt/wt to about 70% wt/wt, from about 10% wt/wt to about 60% wt/wt, from about 10% wt/wt to about 50% wt/wt, from about 10% wt/wt to about 40% wt/wt, from about 10% wt/wt to about 30% wt/wt, and from about 10% wt/wt to about 20% wt/wt of the sweetening composition.

A "steviol glycoside composition" as referred to herein, pertains to a material that includes one or two or more previously purified steviol glycosides found in the *stevia* plant or sweet tea plant or a *stevia* extract or a sweet tea extract. It should be understood that the spray dried composition described herein can be prepared as a mixture first and then spray dried or as individual components that are spray dried first and then combined. It should also be understood that when two or more components are in a mixture that the amount can be varied amoungst the components from 1% wt/wt to 99% wt/wt, and that a total of 100% wt/wt is achieved.

The steviol glycoside compositions noted herein can be used as a sugar substitute alone or in combination with a food product.

The steviol glycosides or steviol glycoside compositions noted herein can be used in beverages, broths, and beverage preparations selected from the group comprising carbonated, non-carbonated, frozen, semi-frozen ("slush"), non-frozen, ready-to-drink, concentrated (powdered, frozen, or syrup), dairy, non-dairy, herbal, non-herbal, caffeinated, non-caffeinated, alcoholic, non-alcoholic, flavored, non-flavored, vegetable-based, fruit-based, root/tuber/corm-based, nut-based, other plant-based, cola-based, chocolate-based, meat-based, seafood-based, other animal-based, algae-based, calorie enhanced, calorie-reduced, and calorie-free products, optionally dispensed in open containers, cans, bottles or other packaging. Such beverages and beverage preparations can be in ready-to-drink, ready-to-cook, ready-to-mix, raw, or ingredient form and can use the *stevia* composition as a sole sweetener or as a co-sweetener.

The steviol glycoside(s) or steviol glycoside compositions noted herein can be used in foods and food preparations (e.g. sweeteners, soups, sauces, flavorings, spices, oils, fats, and condiments) from dairy-based, cereal-based, baked, vegetable-based, fruit-based, root/tuber/corm-based, nut-based, other plant-based, egg-based, meat-based, seafood-based, other animal-based, algae-based, processed (e.g. spreads), preserved (e.g. meals-ready-to-eat rations), and synthesized (e.g. gels) products.

Such foods and food preparations can be in ready-to-eat, ready-to-cook, ready-to-mix, raw, or ingredient form and can use the *stevia* compositions as a sole sweetener or as a co-sweetener.

The steviol glycosides or steviol glycoside compositions noted herein can be used in candies, confections, desserts, and snacks selected from the group comprising dairy-based, cereal-based, baked, vegetable-based, fruit-based, root/tuber/corm-based, nut-based, gum-based, other plant-based, egg-based, meat-based, seafood-based, other animal-based, algae-based, processed (e.g. spreads), preserved (e.g. meals-ready-to-eat rations), and synthesized (e.g. gels) products. Such candies, confections, desserts, and snacks can be in ready-to-eat, ready-to-cook, ready-to-mix, raw, or ingredient form, and can use the *stevia* based compositions as a sole sweetener or as a co-sweetener.

The steviol glycoside(s) or steviol glycoside compositions noted herein can be used in prescription and over-the-counter pharmaceuticals, assays, diagnostic kits, and therapies selected from the group comprising weight control, nutritional supplement, vitamins, infant diet, diabetic diet, athlete diet, geriatric diet, low carbohydrate diet, low fat diet, low protein diet, high carbohydrate diet, high fat diet, high protein diet, low calorie diet, non-caloric diet, oral hygiene products (e.g, toothpaste, mouthwash, rinses, floss, toothbrushes, other implements), personal care products (e.g. soaps, shampoos, rinses, lotions, balms, salves, ointments, paper goods, perfumes, lipstick, other cosmetics), professional dentistry products in which taste or smell is a factor (e.g. liquids, chewables, inhalables, injectables, salves, resins, rinses, pads, floss, implements), medical, veterinarian, and surgical products in which taste or smell is a factor (e.g. liquids, chewables, inhalables, injectables, salves, resins, rinses, pads, floss, implements), and pharmaceutical compounding fillers, syrups, capsules, gels, and coating products.

The steviol glycoside(s) or steviol glycoside compositions noted herein can be used in consumer goods packaging materials and containers selected from the group comprising plastic film, thermoset and thermoplastic resin, gum, foil, paper, bottle, box, ink, paint, adhesive, and packaging coating products.

The steviol glycoside(s) or steviol glycoside compositions noted herein can be used in goods including sweeteners, co-sweeteners, coated sweetener sticks, frozen confection sticks, medicine spoons (human and veterinary uses), dental instruments, presweetened disposable tableware and utensils, sachets, edible sachets, potpourris, edible potpourris, artificial flowers, edible artificial flowers, clothing, edible clothing, massage oils, and edible massage oils.

The steviol glycoside(s) or steviol glycoside compositions noted herein can also be used with "artificial sweeteners". Artificial sweeteners are those, other than sucrose, such as cyclamates and salts thereof, sucralose, aspartame, saccharin and salts thereof, *stevia* (Truvia™), rebaudioside A, xylitol, acesulfame-K, neotame, N—[N-[3-(3-hydroxy-4-methoxyphenyl)propyl]-alpha-aspartyl]-L-phenylalanine 1-methyl ester (hereinafter abbreviated as "ANS9801"), glycyrrhizin, thaumatin, monellin and the like. The steviol glycoside(s) or steviol glycoside compositions noted herein masks, reduces or eliminates the aftertaste associated with the artificial sweetener, (e.g., *stevia*) such that the composition has a taste profile like sugar.

The following paragraphs enumerated consecutively from 1 through 98 provide for various aspects of the present invention. In one embodiment, in a first paragraph (1), the present invention provides:

A steviol glycoside or a steviol glycoside composition with improved solubility in a water or water/alcohol solution wherein the steviol glycosides or steviol glycoside composition are stable in the water or water/alcohol solution for greater than 1 day.

2. The steviol glycoside or steviol glycoside composition according to paragraph 1, wherein the steviol glycosides or steviol glycoside composition are stable in water or water/alcohol solution for greater than 2 days.

3. The steviol glycoside or steviol glycoside composition according to paragraph 2, wherein the steviol glycosides or steviol glycoside composition are stable in water or water/alcohol solution for greater than 5 days.

4. The steviol glycoside or steviol glycoside composition according to paragraph 3, wherein the steviol glycosides or steviol glycoside composition are stable in water or water/alcohol solution for greater than 10 days.

5. The steviol glycoside or steviol glycoside composition according to paragraph 4, wherein the steviol glycosides or steviol glycoside composition are stable in water or water/alcohol solution for greater than 15 days.

6. The steviol glycoside or steviol glycoside composition according to paragraph 5, wherein the steviol glycosides or steviol glycoside composition are stable in water or water/alcohol solution for greater than 20 days.

7. The steviol glycoside or steviol glycoside composition according to paragraph 6, wherein the steviol glycosides or steviol glycoside composition are stable in water or water/alcohol solution for greater than 25 days.

8. The steviol glycoside or steviol glycoside composition according to paragraph 7, wherein the steviol glycosides or steviol glycoside composition are stable in water or water/alcohol solution for greater than 30 days.

9. The steviol glycoside or steviol glycoside composition according to paragraphs 1 through 8, wherein the solubility is ≥1 g/100 g water or water/alcohol solution.

10. The steviol glycoside or steviol glycoside composition according to paragraphs 1 through 9, wherein the solubility is ≥2 g/100 g water or water/alcohol solution.

11. The steviol glycoside or steviol glycoside composition according to paragraphs 1 through 10, wherein the solubility is ≥3 g/100 g water or water/alcohol solution.

12. The steviol glycoside or steviol glycoside composition according to paragraphs 1 through 11, wherein the solubility is ≥5 g/100 g water or water/alcohol solution.

13. The steviol glycoside or steviol glycoside composition according to paragraphs 1 through 12, wherein the solubility is ≥10 g/100 g water or water/alcohol solution.

14. The steviol glycoside or steviol glycoside composition according to paragraphs 1 through 13, wherein the solubility is ≥15 g/100 g water or water/alcohol solution.

15. The steviol glycoside or steviol glycoside composition according to paragraphs 1 through 14, wherein the solubility is ≥20 g/100 g water or water/alcohol solution.

16. The steviol glycoside or steviol glycoside composition according to paragraphs 1 through 15, wherein the solubility is ≥25 g/100 g water or water/alcohol solution.

17. The steviol glycoside or steviol glycoside composition according to paragraphs 1 through 16, wherein the solubility is ≥30 g/100 g water or water/alcohol solution.

18. The steviol glycoside or steviol glycoside composition according to paragraphs 1 through 17, wherein the solubility is ≥35 g/100 g water or water/alcohol solution.

19. The steviol glycoside or steviol glycoside composition according to paragraphs 1 through 18, wherein the solubility is ≥40 g/100 g water or water/alcohol solution.

20. The steviol glycoside or steviol glycoside composition according to paragraphs 1 through 19, wherein the solubility is ≥45 g/100 g water or water/alcohol solution.

21. The steviol glycoside or steviol glycoside composition according to paragraph 1 through 20, wherein the solubility is ≥50 g/100 g water or water/alcohol solution.

22. The steviol glycoside or steviol glycoside composition according to paragraphs 1 through 21, wherein the solubility is ≥55 g/100 g water or water/alcohol solution.

23. The steviol glycoside or steviol glycoside composition according to paragraphs 1 through 22, wherein the solubility is ≥60 g/100 g water or water/alcohol solution.

24. The steviol glycoside or steviol glycoside composition according to paragraphs 1 through 23, wherein the alcohol is selected from the group consisting of methanol, ethanol, propanol, isopropanol, n-butanol, sec-butanol, isobutanol, tert-butanol, n-pentanol, sec-pentanol, isopentanol, and neo-pentanol.

25. The steviol glycoside or steviol glycoside composition according to paragraph 1 through 24, wherein the water or water/alcohol solution is less than 60% alcohol by volume.

26. The steviol glycoside or steviol glycoside composition according to paragraphs 1 through 25, wherein the water or water/alcohol solution is less than 50% alcohol by volume.

27. The steviol glycoside or steviol glycoside composition according to paragraphs 1 through 26, wherein the water or water/alcohol solution is less than 40% alcohol by volume.

28. The steviol glycoside or steviol glycoside composition according to paragraphs 1 through 27, wherein the water or water/alcohol solution is less than 30% alcohol by volume.

29. The steviol glycoside or steviol glycoside composition according to paragraphs 1 through 28, wherein the water or water/alcohol solution is less than 20% alcohol by volume.

30. The steviol glycoside or steviol glycoside composition according to paragraphs 1 through 29, wherein the water or water/alcohol solution is less than 10% alcohol by volume.

31. The steviol glycoside or steviol glycoside composition according to paragraphs 1 through 30, wherein the water or water/alcohol solution is less than 5% alcohol by volume.

32. The steviol glycoside or steviol glycoside composition according to paragraphs 1 through 31, wherein the water or water/alcohol solution is less than 2% alcohol by volume.

33. The steviol glycoside or steviol glycoside composition according to paragraphs 1 through 32, wherein the water or water/alcohol solution is less than 1% alcohol by volume.

34. The steviol glycoside or steviol glycoside composition according to paragraphs 1 through 33, wherein the steviol glycoside is selected from the group consisting of Steviol, Steviolbioside, Stevioside, Rebaudioside A, Rebaudioside B, Rebaudioside C, Rebaudioside D, Rebaudioside E, Rebaudioside F, Rebaudioside M, Rubusoside and Ducoside A.

35. The steviol glycoside or steviol glycoside composition according to paragraph 34, wherein the steviol glycoside or steviol glycoside composition comprises Rebaudioside A.

36. The steviol glycoside or steviol glycoside composition according to paragraph 34, wherein the steviol glycoside composition comprises Rebaudioside A and Rebaudioside B.

37. The steviol glycoside or steviol glycoside composition according to paragraph 34, wherein the steviol glycoside composition comprises Rebaudioside A and Rebaudioside D.

38. The steviol glycoside or steviol glycoside composition according to paragraph 34, wherein the steviol glycoside composition comprises Rebaudioside A and Stevioside.

39. The steviol glycoside or steviol glycoside composition according to paragraph 34, wherein the steviol glycoside composition comprises Rebaudioside B and Rebaudioside D.

40. The steviol glycoside or steviol glycoside composition according to paragraph 34, wherein the steviol glycoside composition comprises Rebaudioside A, Rebaudioside B and Rebaudioside D.

41. The steviol glycoside or steviol glycoside composition according to paragraph 34, wherein the steviol glycoside composition comprises Rebaudioside A, Rebaudioside B, Rebaudioside D, and Stevioside.

42. The steviol glycoside or steviol glycoside composition according to paragraphs 36, 37, 38, 40, and 41 wherein rebaudioside A is the main component.

43. The steviol glycoside or steviol glycoside composition according to paragraphs 40 and 41, wherein the weight percent rebaudioside B and rebaudioside D in water or water/alcohol solution is between 1% to about 20% rebaudioside B and between 1% to about 15% rebaudioside D, wherein the combined weight percent of rebaudioside B and rebaudioside D does not exceed 30%.

44. The steviol glycoside or steviol glycoside composition according to paragraph 43, wherein the weight percent of rebaudioside A, rebaudioside B, and rebaudioside D in water or water/alcohol solution is between 70% to about 85% rebaudioside A, between 10% to about 15% rebaudioside B, and between 5% to about 10% rebaudioside D.

45. The steviol glycoside or steviol glycoside composition according to paragraph 44, wherein the weight percent of rebaudioside A, rebaudioside B, and rebaudioside D in water or water/alcohol solution has a ratio of about 78:15:7.

46. The steviol glycoside or steviol glycoside composition according to paragraph 44, wherein the weight percent of rebaudioside A, rebaudioside B, and rebaudioside D in water or water/alcohol solution has a ratio of about 80:10:6.

47. The steviol glycoside or steviol glycoside composition according to paragraphs 1 through 46, wherein the steviol glycosides or steviol glycoside composition is stable in water or water/alcohol solution between 0° C. and 25° C.

48. The steviol glycoside or steviol glycoside composition according to paragraphs 1 through 47, wherein the steviol glycoside or steviol glycoside composition is stable in water or water/alcohol solution between 5° C. and 24° C.

49. The steviol glycoside or steviol glycoside composition according to paragraphs 1 through 48, wherein the steviol glycoside or steviol glycoside composition is stable in water or water/alcohol solution between 10° C. and 23° C.

50. The steviol glycoside or steviol glycoside composition according to paragraphs 1 through 49, wherein the steviol glycoside or steviol glycoside composition is stable in water or water/alcohol solution between 15° C. and 22° C.

51. The steviol glycoside or steviol glycoside composition according to paragraphs 1 through 50, wherein the steviol glycoside or steviol glycoside composition is stable in water or water/alcohol solution at room or ambient temperature.

52. The steviol glycoside or a steviol glycoside composition according to paragraphs 1 through 51, wherein the steviol glycoside or steviol glycoside composition is in an amorphous form, a crystal form, or mixtures thereof.

53. The steviol glycoside or a steviol glycoside composition according to paragraphs 1 through 52, wherein the steviol glycoside or steviol glycoside composition is in an amorphous form.

54. The steviol glycoside or a steviol glycoside composition according to paragraphs 1 through 52, wherein the steviol glycoside or steviol glycoside composition is in a crystal form.

55. A sweetener composition comprising the steviol glycoside or a steviol glycoside composition according to paragraphs 1 through 54.

56. The sweetener composition according to paragraph 55, further comprising one or more sweeteners selected from the group consisting of cyclamates and salts thereof, sucralose, aspartame, saccharin and salts thereof, *stevia* (Truvia™), rebaudioside A, xylitol, acesulfame-K, neotame, N—[N-[3-(3-hydroxy-4-methoxyphenyl)propyl]-alpha-aspartyl]-L-phenylalanine 1-methyl ester (hereinafter abbreviated as "ANS9801"), glycyrrhizin, thaumatin, monellin, and combinations thereof.

57. A concentrated aqueous sweetener solution comprising steviol glycoside or a steviol glycoside composition, wherein the steviol glycoside or steviol glycoside composition is stable in water or a water/alcohol solution for greater than 1 day.

58. The concentrated aqueous sweetener solution according to paragraph 57, wherein the steviol glycoside or steviol glycoside composition is stable in water or water/alcohol solution for greater than 2 days.

59. The concentrated aqueous sweetener solution according to paragraph 58, wherein the steviol glycoside or steviol glycoside composition is stable in water or water/alcohol solution for greater than 5 days.

60. The concentrated aqueous sweetener solution according to paragraph 59, wherein the steviol glycoside or steviol glycoside composition is stable in water or water/alcohol solution for greater than 10 days.

61. The concentrated aqueous sweetener solution according to paragraph 60, wherein the steviol glycoside or steviol glycoside composition is stable in water or water/alcohol solution for greater than 15 days.

62. The concentrated aqueous sweetener solution according to paragraph 61, wherein the steviol glycoside or steviol glycoside composition is stable in water or water/alcohol solution for greater than 20 days.

63. The concentrated aqueous sweetener solution according to paragraph 62, wherein the steviol glycoside or steviol glycoside composition is stable in water or water/alcohol solution for greater than 25 days.

64. The concentrated aqueous sweetener solution according to paragraph 63, wherein the steviol glycoside or steviol glycoside composition is stable in water or water/alcohol solution for greater than 30 days.

65. The concentrated aqueous sweetener solution according to paragraphs 57 through 64, wherein the solubility of the steviol glycoside or the steviol glycoside composition is ≥1 g/100 g water or water/alcohol solution.

66. The concentrated aqueous sweetener solution according to paragraphs 57 through 65, wherein the solubility of the steviol glycoside or the steviol glycoside composition is ≥2 g/100 g water or water/alcohol solution.

67. The concentrated aqueous sweetener solution according to paragraphs 57 through 66, wherein the solubility of the steviol glycoside or the steviol glycoside composition is ≥3 g/100 g water or water/alcohol solution.

68. The concentrated aqueous sweetener solution according to paragraphs 57 through 67, wherein the solubility of the steviol glycoside or the steviol glycoside composition is ≥5 g/100 g water or water/alcohol solution.

69. The concentrated aqueous sweetener solution according to paragraphs 57 through 68, wherein the solubility of the steviol glycoside or the steviol glycoside composition is ≥10 g/100 g water or water/alcohol solution.

70. The concentrated aqueous sweetener solution according to paragraphs 57 through 69, wherein the solubility is of the steviol glycoside or the steviol glycoside composition ≥15 g/100 g water or water/alcohol solution.

71. The concentrated aqueous sweetener solution according to paragraphs 57 through 70, wherein the solubility of the steviol glycoside or the steviol glycoside composition is ≥20 g/100 g water or water/alcohol solution.

72. The concentrated aqueous sweetener solution according to paragraphs 57 through 71, wherein the solubility of the steviol glycoside or the steviol glycoside composition is ≥25 g/100 g water or water/alcohol solution.

73. The concentrated aqueous sweetener solution according to paragraphs 57 through 72, wherein the solubility of the steviol glycoside or the steviol glycoside composition is ≥30 g/100 g water or water/alcohol solution.

74. The concentrated aqueous sweetener solution according to paragraphs 57 through 73, wherein the solubility of the steviol glycoside or the steviol glycoside composition is ≥35 g/100 g water or water/alcohol solution.

75. The concentrated aqueous sweetener solution according to paragraphs 57 through 74, wherein the solubility of the steviol glycoside or the steviol glycoside composition is ≥40 g/100 g water or water/alcohol solution.

76. The concentrated aqueous sweetener solution according to paragraphs 57 through 75, wherein the solubility of the steviol glycoside or the steviol glycoside composition is ≥45 g/100 g water or water/alcohol solution.

77. The concentrated aqueous sweetener solution according to paragraphs 57 through 76, wherein the solubility of the steviol glycoside or the steviol glycoside composition is ≥50 g/100 g water or water/alcohol solution.

78. The concentrated aqueous sweetener solution according to paragraphs 57 through 77, wherein the solubility of the steviol glycoside or the steviol glycoside composition is ≥55 g/100 g water or water/alcohol solution.

79. The concentrated aqueous sweetener solution according to paragraphs 57 through 78, wherein the solubility of the steviol glycoside or the steviol glycoside composition is ≥60 g/100 g water or water/alcohol solution.

80. The concentrated aqueous sweetener solution according to paragraphs 57 through 79, wherein the water or water/alcohol solution is less than 60% alcohol by volume.

81. The concentrated aqueous sweetener solution according to paragraphs 57 through 80, wherein the water or water/alcohol solution is less than 50% alcohol by volume.

82. The concentrated aqueous sweetener solution according to paragraphs 57 through 81, wherein the water or water/alcohol solution is less than 40% alcohol by volume.

83. The concentrated aqueous sweetener solution according to paragraphs 57 through 82, wherein the water or water/alcohol solution is less than 30% alcohol by volume.

84. The concentrated aqueous sweetener solution according to paragraphs 57 through 83, wherein the water or water/alcohol solution is less than 20% alcohol by volume.

85. The concentrated aqueous sweetener solution according to paragraphs 57 through 84, wherein the water or water/alcohol solution is less than 10% alcohol by volume.

86. The concentrated aqueous sweetener solution according to paragraphs 57 through 85, wherein the water or water/alcohol solution is less than 5% alcohol by volume.

87. The concentrated aqueous sweetener solution according to paragraphs 57 through 86, wherein the water or water/alcohol solution is less than 2% alcohol by volume.

88. The concentrated aqueous sweetener solution according to paragraphs 57 through 87, wherein the water or water/alcohol solution is less than 1% alcohol by volume.

89. The concentrated aqueous sweetener solution according to paragraphs 57 through 88, wherein the steviol glycoside or steviol glycoside composition are stable in water or water/alcohol solution between 0° C. and 25° C.

90. The concentrated aqueous sweetener solution according to paragraphs 57 through 89, wherein the steviol glycoside or steviol glycoside composition is stable in water or water/alcohol solution between 5° C. and 24° C.

91. The concentrated aqueous sweetener solution according to paragraphs 57 through 90, wherein the steviol glycoside or steviol glycoside composition is stable in water or water/alcohol solution between 10° C. and 23° C.

92. The concentrated aqueous sweetener solution according to paragraphs 57 through 91, wherein the steviol glycoside or steviol glycoside composition is stable in water or water/alcohol solution between 15° C. and 22° C.

93. A process for the preparation of steviol glycoside or a steviol glycoside composition with improved solubility in an aqueous solution comprising the following steps: (1) mixing a steviol glycoside or a steviol glycoside composition with water, (2) heating the mixture while stirring, until the mixture was completely dissolved to obtain a clear solution, (3) further stirring the solution at the temperature, and then cooling to ambient temperature, and (4) subject the solution to spray drying.

94. The process according to paragraph 93, wherein step (4) is replaced with subjecting the solution to crystallization.

95. The process according to paragraph 93 or 94, wherein the mixture is heated to 40-100° C. in step (2).

96. The process according to paragraph 95, wherein the mixture is heated to 50-90° C. in step (2).

97. The process according to paragraph 96, wherein the mixture is heated to 60-70° C. in step (2).

98. The concentrated aqueous sweetener solution according to paragraphs 57 through 92, wherein the alcohol is selected from the group consisting of methanol, ethanol, propanol, isopropanol, n-butanol, sec-butanol, isobutanol, tert-butanol, n-pentanol, sec-pentanol, isopentanol, and neopentanol.

99. Steviol glycoside or a steviol glycoside composition with improved solubility in a water or water/alcohol solution wherein the steviol glycosides or steviol glycoside composition contain sweet tea extract.

100. The steviol glycoside or steviol glycoside composition according to paragraph 99, wherein the sweet tea extract contains rubusoside.

In another aspect, the present embodiments relate to the following paragraphs numbered consecutively from 1 to 23. For example in one embodiment, the first (1) paragraph, a steviol glycoside or a steviol glycoside composition with improved solubility in a water or water/alcohol solution wherein the steviol glycoside or steviol glycoside composition is stable in the water or water/alcohol solution for at least 1 day to greater than 30 days at a temperature from 0° C. to about 25° C.

2. The steviol glycoside or steviol glycoside composition according to paragraph 1, wherein the solubility is from greater than or equal to 1 g/100 g water to greater than or equal to 60 g/100 g water or water/alcohol solution.

3. The steviol glycoside or steviol glycoside composition according to paragraph 1, wherein the alcohol is selected from the group consisting of methanol, ethanol, propanol, isopropanol, n-butanol, sec-butanol, isobutanol, tert-butanol, n-pentanol, sec-pentanol, isopentanol, and neopentanol.

4. The steviol glycoside or steviol glycoside composition according to paragraph 1, wherein the water or water/alcohol solution is from about 60% to about 1% alcohol by volume.

5. The steviol glycoside or steviol glycoside composition according to paragraph 1, wherein the steviol glycoside or the steviol glycoside composition comprises Steviol, Steviolbioside, Stevioside, Rebaudioside A, Rebaudioside B, Rebaudioside C, Rebaudioside D, Rebaudioside E, Rebaudioside F, Rebaudioside M, Rubusoside and Ducoside A, *stevia* extract or sweet tea extract.

6. The steviol glycoside or steviol glycoside composition according to paragraph 5, wherein the steviol glycoside or steviol glycoside composition comprises Rebaudioside A, or Rebaudioside A and Rebaudioside B, or Rebaudioside A and Rebaudioside D, or Rebaudioside A and Stevioside, or Rebaudioside B and Rebaudioside D, or Rebaudioside A, Rebaudioside B and Rebaudioside D or Rebaudioside A, Rebaudioside B, Rebaudioside D, and Stevioside.

7. The steviol glycoside or steviol glycoside composition according to paragraph 6, wherein rebaudioside A is the main component.

8. The steviol glycoside or steviol glycoside composition according to paragraph 1, wherein the steviol glycoside or steviol glycoside composition is stable in water or water/alcohol solution at room or ambient temperature.

9. The steviol glycoside or a steviol glycoside composition according to paragraph 1, wherein the steviol glycoside or steviol glycoside composition is in an amorphous form, a crystal form, or mixtures thereof.

10. The steviol glycoside or a steviol glycoside composition according to paragraph 1, wherein the steviol glycoside or a steviol glycoside composition is dissolved in solution.

11. The steviol glycoside or a steviol glycoside composition according to paragraph 1, wherein the solution is not turbid.

12. A sweetener composition comprising the steviol glycoside or a steviol glycoside composition according to claim 1 and a sweetener.

13. The sweetener composition according to paragraph 12, wherein the sweetener comprises cyclamates and salts thereof, sucralose, aspartame, saccharin and salts thereof, stevia (Truvia™), rebaudioside A, xylitol, acesulfame-K, neotame, N—[N-[3-(3-hydroxy-4-methoxyphenyl)propyl]-alpha-aspartyI]-L-phenylalanine 1-methyl ester (hereinafter abbreviated as "ANS9801"), glycyrrhizin, thaumatin, monellin, and combinations thereof.

14. A process for the preparation of steviol glycoside or a steviol glycoside composition with increased solubility in an aqueous solution, compared to a nontreated steviol glycoside or a nontreated steviol glycoside composition comprising the steps: mixing a steviol glycoside or a steviol glycoside composition with water to form a mixture; heating the mixture until the mixture provides a solution; cooling the solution to ambient temperature; and subjecting the solution to spray drying.

15. The process according to paragraph 14, wherein the mixture is heated to 40-100° C.

16. The process according to paragraph 14, wherein the steviol glycoside or the steviol glycoside composition comprises Steviol, Steviolbioside, Stevioside, Rebaudioside A, Rebaudioside B, Rebaudioside C, Rebaudioside D, Rebaudioside E, Rebaudioside F, Rebaudioside M, Rubusoside and Ducoside A, stevia extract or sweet tea extract.

17. A spray dried steviol glycoside or the steviol glycoside composition comprising Steviol, Steviolbioside, Stevioside, Rebaudioside A, Rebaudioside B, Rebaudioside C, Rebaudioside D, Rebaudioside E, Rebaudioside F, Rebaudioside M, Rubusoside and Ducoside A, stevia extract or sweet tea extract.

18. The spray dried steviol glycoside or the steviol glycoside composition of paragraph 17, wherein the steviol glycoside or the steviol glycoside composition is stable in a water or a water/alcohol solution for at least 1 day to greater than 30 days at a temperature from 0° C. to about 25° C.

19. The spray dried steviol glycoside or the steviol glycoside composition of paragraph 18, wherein the steviol glycoside or the steviol glycoside composition is soluble from greater than or equal to 1 g/100 g water to greater than or equal to 60 g/100 g water or water/alcohol solution.

20. A spray dried rebaudioside A and rebaudioside B composition wherein the spray dried rebaudioside A and rebaudioside B composition has a melting point of from about 221° C. to about 227° C.

21. A spray dried rebaudioside A, rebaudioside B and rebaudioside D composition wherein the spray dried rebaudioside A, rebaudioside B and rebaudioside D composition has a melting point of from about 224° C. to about 227° C.

22. A spray dried rebaudioside A and rebaudioside D composition wherein the spray dried rebaudioside A and rebaudioside D composition has a melting point of from about 224° C. to about 226° C.

In another aspect, the present embodiments relate to the following paragraphs numbered consecutively from 1 to 23. For example in one embodiment, the first (1) paragraph, a steviol glycoside or a steviol glycoside composition with improved solubility in a water or water/alcohol solution wherein the steviol glycoside or steviol glycoside composition is stable in the water or water/alcohol solution for at least 1 day to greater than 30 days at a temperature from 0° C. to about 25° C.

2. The steviol glycoside or steviol glycoside composition according to paragraph 1, wherein the solubility is from greater than or equal to 1 g/100 g water to greater than or equal to 60 g/100 g water or water/alcohol solution.

3. The steviol glycoside or steviol glycoside composition according to either of paragraphs 1 or 2, wherein the alcohol is selected from the group consisting of methanol, ethanol, propanol, isopropanol, n-butanol, sec-butanol, isobutanol, tert-butanol, n-pentanol, sec-pentanol, isopentanol, and neopentanol.

4. The steviol glycoside or steviol glycoside composition according to either of paragraphs 1 or 2, wherein the water or water/alcohol solution is from about 60% to about 1% alcohol by volume.

5. The steviol glycoside or steviol glycoside composition according to paragraph 4, wherein the steviol glycoside or the steviol glycoside composition comprises Steviol, Steviolbioside, Stevioside, Rebaudioside A, Rebaudioside B, Rebaudioside C, Rebaudioside D, Rebaudioside E, Rebaudioside F, Rebaudioside M, Rubusoside and Ducoside A, stevia extract or sweet tea extract.

6. The steviol glycoside or steviol glycoside composition according to paragraph 5, wherein the steviol glycoside or steviol glycoside composition comprises Rebaudioside A, or Rebaudioside A and Rebaudioside B, or Rebaudioside A and Rebaudioside D, or Rebaudioside A and Stevioside, or Rebaudioside B and Rebaudioside D, or Rebaudioside A, Rebaudioside B and Rebaudioside D or Rebaudioside A, Rebaudioside B, Rebaudioside D, and Stevioside.

7. The steviol glycoside or steviol glycoside composition according to paragraph 6, wherein rebaudioside A is the main component.

8. The steviol glycoside or steviol glycoside composition according to either paragraph 1 or 2, wherein the steviol glycoside or steviol glycoside composition is stable in water or water/alcohol solution at room or ambient temperature.

9. The steviol glycoside or a steviol glycoside composition according to either paragraph 1 or 2, wherein the steviol glycoside or steviol glycoside composition is in an amorphous form, a crystal form, or mixtures thereof.

10. The steviol glycoside or a steviol glycoside composition according to either paragraph 1 or 2, wherein the steviol glycoside or a steviol glycoside composition is dissolved in solution.

11. The steviol glycoside or a steviol glycoside composition according to either paragraph 1 or 2, wherein the solution is not turbid.

12. A sweetener composition comprising the steviol glycoside or a steviol glycoside composition according to either paragraph 1 or 2 and a sweetener.

13. The sweetener composition according to paragraph 12, wherein the sweetener comprises cyclamates and salts thereof, sucralose, aspartame, saccharin and salts thereof, stevia (Truvia™), rebaudioside A, xylitol, acesulfame-K, neotame, N—[N-[3-(3-hydroxy-4-methoxyphenyl)propyl]-alpha-aspartyI]-L-phenylalanine 1-methyl ester (hereinafter abbreviated as "ANS9801"), glycyrrhizin, thaumatin, monellin, and combinations thereof.

14. A process for the preparation of steviol glycoside or a steviol glycoside composition with increased solubility in an aqueous solution, compared to a nontreated steviol glycoside or a nontreated steviol glycoside composition comprising the steps: mixing a steviol glycoside or a steviol glycoside composition with water to form a mixture; heating the mixture until the mixture provides a solution; cooling the solution to ambient temperature; and subjecting the solution to spray drying.

15. The process according to paragraph 14, wherein the mixture is heated to 40-100° C.

16. The process according to either paragraph 14 or 15, wherein the steviol glycoside or the steviol glycoside composition comprises Steviol, Steviolbioside, Stevioside, Rebaudioside A, Rebaudioside B, Rebaudioside C, Rebaudioside D, Rebaudioside E, Rebaudioside F, Rebaudioside M, Rubusoside and Ducoside A, *stevia* extract or sweet tea extract.

17. A spray dried steviol glycoside or the steviol glycoside composition comprising Steviol, Steviolbioside, Stevioside, Rebaudioside A, Rebaudioside B, Rebaudioside C, Rebaudioside D, Rebaudioside E, Rebaudioside F, Rebaudioside M, Rubusoside and Ducoside A, *stevia* extract or sweet tea extract.

18. The spray dried steviol glycoside or the steviol glycoside composition of paragraph 17, wherein the steviol glycoside or the steviol glycoside composition is stable in a water or a water/alcohol solution for at least 1 day to greater than 30 days at a temperature from 0° C. to about 25° C.

19. The spray dried steviol glycoside or the steviol glycoside composition of paragraph 18, wherein the steviol glycoside or the steviol glycoside composition is soluble from greater than or equal to 1 g/100 g water to greater than or equal to 60 g/100 g water or water/alcohol solution.

20. A spray dried rebaudioside A and rebaudioside B composition wherein the spray dried rebaudioside A and rebaudioside B composition has a melting point of from about 221° C. to about 227° C.

21. A spray dried rebaudioside A, rebaudioside B and rebaudioside D composition wherein the spray dried rebaudioside A, rebaudioside B and rebaudioside D composition has a melting point of from about 224° C. to about 227° C.

22. A spray dried rebaudioside A and rebaudioside D composition wherein the spray dried rebaudioside A and rebaudioside D composition has a melting point of from about 224° C. to about 226° C.

The invention will be further described with reference to the following non-limiting Examples. It will be apparent to those skilled in the art that many changes can be made in the embodiments described without departing from the scope of the present invention. Thus the scope of the present invention should not be limited to the embodiments described in this application, but only by embodiments described by the language of the claims and the equivalents of those embodiments. Unless otherwise indicated, all percentages are by weight.

EXAMPLES

TABLE 1

Raw materials

| Component | Lot | RA (%) | RB (%) | RD (%) | Total stevia glycosides (%) |
|---|---|---|---|---|---|
| RA | EPC094-17-03 | 99.56 | — | — | — |
| RB | EPC006-30-03 | — | 99.3 | — | — |
| RD | EPC094-28-11 | — | — | 95.10 | — |
| RA + RD | CT001-131105 | 90.1 | — | 7.0 | 98.4 |
| RA + RB + RD | CT001-131108 | 79.8 | 10.3 | 6.3 | 96.8 |
| RA60 | CT001-120301 | 66.52 | — | 1.40 | 97.34 |
| RA80 | CT001-140203 | 80.2 | 1.22 | 0.88 | 95.8 |
| RA97 | CT001-130602 | 98.0 | — | — | — |

Example 1

General Process for Preparing Steviol Glycosides with Improved Solubility

A steviol glycoside or steviol glycosides were mixed with water. The mixture was then heated to 60-70° C. with stirring, until the mixture was completely dissolved to obtain a clear solution. The solution was then stirred for an additional 30 min at 60-70° C., and then was then cooled to ambient temperature. The solution was then spray dried using a L-117 (Beijing Laiheng Scientific Co., Ltd) with inlet temperature: 135° C.; outlet temperature: 90° C.; feeding speed: 200 mL/h; pressure: 1.8 KPa; to obtain the product, in the form of white powders (yield=95 wt %).

Various steviol glycosides and steviol glycoside compositions with improved solubility were prepared by using raw materials listed in Table 1. These raw materials are used in the following Examples 2-6 as indicated.

Example 2

Evaluation of Solubility of the Steviol Glycosides and Steviol Glycoside Compositions with Improved Solubility The solubilities of steviol glycosides and steviol glycoside compositions listed in Table 1 were evaluated according to the following procedure. Raw materials listed in Table 1 were treated and spray dried according to Example 1 and then dissolved in water at a weight ratio of 1:10 and the mixture was heated to 70° C. until the solid was completely dissolved, to obtain an aqueous solution. The solution was cooled to ambient temperature, and the stability (i.e. the period until precipitation) of the solution was observed. The solubility results of the treated steviol glycosides and steviol glycoside compositions are shown in Table 2.

TABLE 2

| Sample No. | RA (%) | RB (%) | RD (%) | Soluble at 70° C. | Stability at RT |
|---|---|---|---|---|---|
| 1 | 70 | 18 | 12 | yes | 20 h |
| 2 | 90 | 6 | 4 | yes | >5 days |
| 3 | 88 | 5 | 7 | yes | >5 days |
| 4 | 78 | 15 | 7 | yes | >5 days |
| 5 | 87 | 11 | 2 | yes | >5 days |
| 6 | 76 | 9 | 15 | yes | >5 days |
| 7 | 90 | 10 | 0 | yes | >15 days |
| 8 | 78* | 15 | 7 | yes | >5 days |
| 9 | 78** | 15 | 7 | yes | >5 days |
| 10 | 78*** | 15 | 7 | yes | >5 days |
| 11 | 0 | 50 | 50 | no | — |
| 12 | 0 | 100 | 0 | no | — |
| 13 | 0 | 0 | 100 | no | — |
| 14 | 100 | 0 | 0 | yes | 1 hour |

*RA97,
**RA80,
***RA60

The results of Example 2 show specific pairings of treated steviol glycosides (Samples 1-10) that had improved solubility in an aqueous solution in comparison with steviol glycosides comprising rebaudioside B and D, and rebaudioside A, B, and D individually (Samples 11-14). RA, RB, RD, and 50:50 RB/RD have poor solubility whereas the steviol glycosides mixtures comprising RA, RB, and RD wherein RB is 0-20%, RD is 0-15%, and RB+RD<30% have the most improved solubility.

Example 3

Evaluation of Solubility of Steviol Glycosides with Improved Solubility

The mixture in Table 2, wherein RA:RB:RD=78/15/7 (Sample 4) that was first heat treated and spray dried according to Example 1 was formulated into aqueous solutions at various concentrations, and the maximum solubility, temperature, and stability were determined and summarized in the Table 3.

TABLE 3

| Content (g/100 ml water) | Soluble temperature | Stability |
| --- | --- | --- |
| 15 | soluble at 80° C. | >2.5 days |
| 20 | soluble at 85° C. | >2 days |
| 25 | soluble at 90° C. | >2 days |
| 30 | soluble at 90° C. | >2 days |
| 35 | soluble at 90° C. (slightly cloudy) | >1.5 days |

The results show that the solubility of the mixture has an upper limit of 30 g/100 ml, and the stability of the obtained 30% wt/wt solution is more than 2 days at ambient temperature.

Example 4

Evaluation of Solubility of Steviol Glycoside Compositions with Improved Solubility Steviol glycosides with further improved solubility that were first heat treated and spray dried according to Example 1 were evaluated for stability in various aqueous concentrations shown in Table 4.

TABLE 4

| Lot | 20 g/100 g water | 30 g/100 g water | 50 g/100 g water | 60 g/100 g water |
| --- | --- | --- | --- | --- |
| CT001-131108 | — | >30 days | >30 days | >30 days |
| CT001-131105 | 6 days | 3 days | 3 days | — |

The results demonstrate that Lot CT001-131108, a steviol glycoside composition comprising RA:RB:RD=80/10/6 is stable in aqueous solution for greater than 30 days at a concentration of 60 g/100 g water.

Example 5

Powder XRD of the Steviol Glycoside Composition with Improved Solubility

Steviol glycoside compositions with improved solubility that were first heat treated and spray dried according to Example 1 were subjected to Powder XRD. The HPLC results are shown in Table 5. HPLC was conducted using a Supelcosil LC-NH$_2$ column at 40° C. with 80:20 ACN/water mobile phase adjusted to pH 3 with 85% phosphoric acid. The flow rate was adjusted so that the retention time of standard RA (Wako Ltd.) was 21 min.

TABLE 5

| Lot | RA (%, by HPLC) | RB (%, by HPLC) | RD (%, by HPLC) |
| --- | --- | --- | --- |
| 094-39-01 | 79.83 | 12.66 | 5.36 |
| 094-39-02 | 80.34 | 12.82 | 5.32 |

Figure 2:
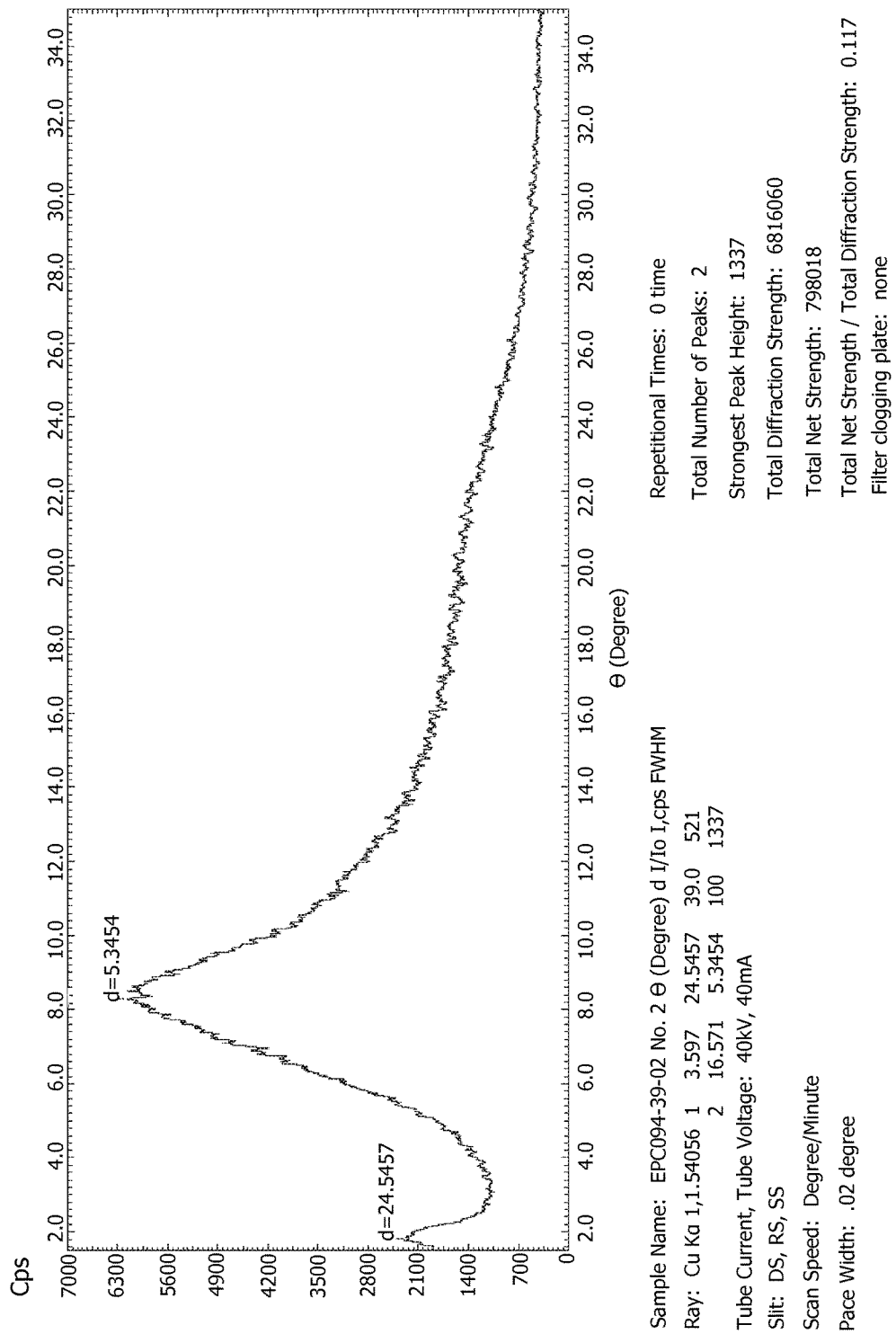
FIG. 2 shows a Power XRD spectrum of sample 094-39-02.

It can be seen from the Powder XRD (FIG. 1 and FIG. 2) that the spectrum of the *Stevia* glycoside compositions with improved solubility show an amorphous product, not a crystalline polymorph, and thus are different from the soluble forms described in the disclosed references.

Example 6

Several Steviol Glycosides were Mixed Using High Purity RA, RB, RD, and Stevioside (SS)

Steviol glycosides that have not been heat treated and spray dried according to Example 1 were mixed with water and heated to 70° C. to give the following mixtures, respectively. The composition of each steviol glycoside, mixture concentration, solubility, and stability are shown in Table 6.

TABLE 6

| Composition | Ratio | Concentration (g/100 mL water) | Soluble at 70° C. | Stability at RT |
| --- | --- | --- | --- | --- |
| RA/RD | 85/15 | 10 | Yes | >6 days |
| RA/RD | 90/10 | 10 | Yes | 5 days |
| RA/SS | 90/10 | 10 | Yes | 17 hours |
| RA/SS | 95/5 | 10 | Yes | 9 hours |
| RA/RB | 85/15 | 10 | Yes | >6 days |
| RA/RB | 95/5 | 10 | Yes | 45 hours |
| RA/RB/RD | 90/6/4 | 20 | Yes | 43 hours |
| RB/RD | 70/30 | 5 | No | — |
| RB/SS | 90/10 | 5 | No | — |

SS showed some improvement to the solubility of RA. For the RA/RB system, the solubility of RA was minimized until the ratio of RB reached 10% or greater. For the RA/RD system, the solubility of was minimized until the ratio of RD reached 15% or greater.

Example 7

Additional RA/RB Stability Data

RA-RB-1 and RA-RB-3 were prepared according to the current spray drying process and tested for concentration dependent solubility.

TABLE 7

| Sample | Lot# | RA | RB |
|---|---|---|---|
| RA-RB-1 | EPC116-44-02 | 89.95% | 6.61% |
| RA-RB-3 | EPC137-08-01 | 78.12% | 19.35% |

TABLE 8

| RA-RB-1 | Solid/liquid ratio | | Stability (days) |
|---|---|---|---|
| Spray dried | 5% | Dissolved at room temperature | >30 days |
|  | 1% |  | >30 days |
|  | 0.50% |  | >30 days |
|  | 10% |  | >30 days |
| RA-RB-3 | Solid/liquid ratio | | Stability |
| Spray dried | 1% | Dissolved at room temperature | 2 hours |
|  | 5% |  | 2 hours |
|  | 10% |  | 1.5 hours |
|  | 20% |  | 1 hours |
|  | 30% |  | Slightly turbid |

As shown above, as the concentration of RA-RB-1 reaches 10%, the solution remains stable for over 30 days. The initial solubility of RA-RB-3 reaches 20%, but is less stable.

Example 8

Melting Point Determinations

Melting points of untreated and treated steviol glycosides and steviol glycoside compositions were taken and disclosed in Table 9. Melting points were determined using a X-4 (Beijing Tech Instrument Co., Ltd.) with heating speed of 1° C./min.

The melting point of treated samples are lower than RA and untreated samples, demonstrating an affirmative change in structure of the treated compositions.

What is claimed is:

1. A steviol glycoside composition with improved solubility in a water or water/alcohol solution,
wherein the steviol glycoside composition is stable in the water or water/alcohol solution for at least 1 day to greater than 30 days at a temperature from 0° C. to about 25° C.,
wherein the steviol glycoside composition comprises rebaudioside A and rebaudioside B, or rebaudioside A and rebaudioside D, or rebaudioside A and stevioside, or rebaudioside A, rebaudioside B and rebaudioside D, or rebaudioside A, rebaudioside B, rebaudioside D and stevioside, and
wherein the steviol glycosides in the steviol glycoside composition are present in an amorphous, spray-dried form and the steviol glycoside composition has a solubility that is greater than or equal to 10 g/100 g water or water/alcohol solution.

2. The steviol glycoside composition according to claim 1, wherein the alcohol is selected from the group consisting of methanol, ethanol, propanol, isopropanol, n-butanol, sec-butanol, isobutanol, tert-butanol, n-pentanol, sec-pentanol, isopentanol and neopentanol.

3. The steviol glycoside composition according to claim 1, wherein the water or water/alcohol solution is from about 60% to about 1% alcohol by volume.

4. The steviol glycoside composition according to claim 1, wherein rebaudioside A is the main component.

5. The steviol glycoside composition according to claim 1, wherein the steviol glycoside composition is stable in water or water/alcohol solution at room or ambient temperature.

6. A sweetener composition comprising the steviol glycoside composition according to claim 1 and a sweetener.

7. The sweetener composition according to claim 6, wherein the sweetener is selected from the group consisting of cyclamates and salts thereof, sucralose, aspartame, saccharin and salts thereof, *stevia*, rebaudioside A, xylitol, acesulfame-K, neotame, N [N-[3-(3-hydroxy-4-methoxyphenyl)propyl]-alpha-aspartyl]-L-phenylalanine -1-methyl ester, glycyrrhizin, thaumatin, monellin, and combinations thereof.

8. A spray dried steviol glycoside composition comprising rebaudioside A and rebaudioside B, or rebaudioside A and rebaudioside D, or rebaudioside A and stevioside, or rebau-

TABLE 9

| Sample | Lot# | RA | RB | RD | Melting point |
|---|---|---|---|---|---|
| Untreated | | | | | |
| RA | EPC094-17-03 | 99.6% | | | 235-237° C. |
| RB | EPC082-31-03 | | 92.74% | | 224-226° C. |
| RD | EPC094-28-11 | | | 95.10% | 285-287° C. |
| RA/RB/RD | | 79% | 10% | 6% | 233-236° C. |
| RA/RB | | 90% | 6.6% | | 234-236° C. |
| Treated | | | | | |
| RA-RB-1 | EPC116-44-02 | 89.95% | 6.61% | | 224-227° C. |
| RA-RB-2 | EPC116-32-01 | 93.05% | 5.00% | | 223-226° C. |
| RA/RB/RD | EPC130-36-03 | 79.08% | 10.28% | 6.25% | 224-227° C. |
| RA-RB-3 | EPC137-08-01 | 78.12% | 19.35% | | 221-223° C. |
| RA/RD | CT001-130511 | 90.0% | | 6.1% | 224-226° C. | dioside A, rebaudioside B and rebaudioside D, or rebaudioside A, rebaudioside B, rebaudioside D and stevioside, wherein the steviol glycoside composition is stable in a water or a water/alcohol solution for at least 1 day to greater than 30 days at a temperature from 0° C. to about 25° C., and wherein the steviol glycosides in the steviol glycoside composition are present in an amorphous form, and the steviol glycoside composition has a solubility that is greater than or equal to 10 g/100 g water or water/alcohol solution.

9. The steviol glycoside composition of claim 1, wherein the steviol glycoside composition further comprises rebaudioside M.

10. The steviol glycoside composition of claim 8, wherein the steviol glycoside composition further comprises rebaudioside M.

11. The steviol glycoside composition according to claim 1, wherein the steviol glycoside composition has a solubility of greater than or equal to 60 g/100 g water or water/alcohol solution.

12. The spray dried steviol glycoside composition according to claim 8, wherein the steviol glycoside composition has a solubility of greater than or equal to 60 g/100 g water or water/alcohol solution.

* * * * *